United States Patent
Galbraith

(10) Patent No.: US 8,621,867 B2
(45) Date of Patent: Jan. 7, 2014

(54) ROTARY HEAT ENGINE POWERED BY RADIANT ENERGY

(75) Inventor: Stephen Douglas Galbraith, Holbrook, PA (US)

(73) Assignee: Separation Design Group, LLC, Waynesburg, PA (US)

( * ) Notice: Subject to any disclaimer, the term of this patent is extended or adjusted under 35 U.S.C. 154(b) by 1042 days.

(21) Appl. No.: 12/525,192

(22) PCT Filed: Feb. 1, 2008

(86) PCT No.: PCT/US2008/001402
§ 371 (c)(1),
(2), (4) Date: Dec. 3, 2009

(87) PCT Pub. No.: WO2008/094696
PCT Pub. Date: Aug. 7, 2008

(65) Prior Publication Data
US 2010/0115947 A1    May 13, 2010

Related U.S. Application Data

(60) Provisional application No. 60/887,763, filed on Feb. 1, 2007.

(51) Int. Cl.
B60K 16/00      (2006.01)
F01B 29/10      (2006.01)

(52) U.S. Cl.
USPC ............................. 60/641.8; 60/517; 60/525

(58) Field of Classification Search
USPC ................................ 60/517, 525, 645, 641.8
See application file for complete search history.

(56) References Cited

U.S. PATENT DOCUMENTS

| | | | |
|---|---|---|---|
| 2,814,551 A * | 11/1957 | Broeze et al. | 60/525 |
| 3,991,575 A | 11/1976 | Bailey et al. | |
| 3,996,477 A | 12/1976 | Laing | |
| 4,070,862 A | 1/1978 | Doerner et al. | |
| 4,138,847 A | 2/1979 | Hill | |
| 4,145,890 A * | 3/1979 | Cruz | 60/675 |
| 4,195,486 A * | 4/1980 | Rivera-Cruz | 60/675 |
| 4,307,573 A | 12/1981 | King | |
| 4,387,704 A | 6/1983 | Minden | |
| 4,524,587 A | 6/1985 | Kantor | |
| 4,535,606 A | 8/1985 | Rannenberg | |
| 5,010,735 A | 4/1991 | Assaf | |
| 5,195,321 A * | 3/1993 | Howard | 60/525 |
| 5,899,071 A * | 5/1999 | Stone et al. | 60/641.8 |

FOREIGN PATENT DOCUMENTS

WO    WO 2008/094696    8/2008

OTHER PUBLICATIONS

Hoffman, "Swash Plate Pump" http://www.animatedsoftware.com/pumpglos/swashpla.htm, Website last modified in Feb. 2002, Accessed Apr. 28, 2010.

* cited by examiner

*Primary Examiner* — Hoang Nguyen
(74) *Attorney, Agent, or Firm* — Ballard Spahr LLP

(57) ABSTRACT

Provided is a rotating energy conversion device that includes a heat absorber having a working fluid therein, a power converter in fluid communication with the heat absorber, and a heat rejecter in fluid communication with each one of the heat absorber and the power converter. The device may utilize an energy source that provides radiant energy to the heat absorber. The device may utilize a segmented energy source that may have a plurality of segments, wherein each segment may be either activated or deactivated to deliver the radiant energy to the heat absorber. The device may utilize waste heat produced by the device to create additional work. Furthermore, the device may utilize multiple thermodynamic cycles.

67 Claims, 30 Drawing Sheets

ROTARY HEAT ENGINE POWERED BY RADIANT ENERGY

CROSS-REFERENCE TO RELATED APPLICATIONS

This application is the National Stage of International Application No. PCT/US2008/001402, filed Feb. 1, 2008, which claims the benefit of U.S. Provisional Application No. 60/887,763, filed Feb. 1, 2007, the disclosures of which are incorporated herein by reference in their entirety.

BACKGROUND OF THE INVENTION

Various types of heat engines have been designed that perform useful work by extracting a portion of the energy that exists in a heat source relative to an environment. In a general sense, these engines often convert the microscopic kinetic energy of molecules to a macroscopic form of energy that can be utilized to perform work, such as moving a vehicle, pumping water, or rotating the armature of an electric generator.

One engine, the reciprocating steam engine, was used in early automobiles and locomotives because of the simplicity of design, flat torque curve, and multiple fuel capability. Such steam engines were inefficient and may have only had an efficiency of 8-10%. Therefore, internal combustion engines superseded steam engines because of their better thermodynamic efficiency and ease of use.

Internal combustion engines have provided good service as prime movers for transportation and auxiliary power sources, however, they have significant weaknesses. For example such engines are noisy, polluting, have narrow speed/torque characteristics, have stringent fuel chemistry requirements, have concentrated thermal signatures and are high maintenance. A typical gasoline internal combustion engine may have an efficiency of 15-30%, and a diesel engine may only be 25-40% efficient.

In an attempt to address the many inadequacies of the internal combustion engine, engineers formulated the idea of an external combustion rotary heat engine. Such engines in comparison with other types of heat engines, offer quietness and low pollution. Furthermore, external combustion rotary heat engines may offer simplicity and improved efficiency. Rotary heat engines, however, have never been commercialized because of certain short comings.

For example, some rotary heat engines/heat pumps have heat transfer structures that have not been optimized to promote nucleate boiling and dropwise condensation, and their primary energy sources have not been optimized to produce a high energy density. Such engines typically utilize convection or forced convection as the primary heat vector. In these engines, fins, staggered heat exchange tubes, and fan blades are provided to increase convective interaction with the hot side gases and to provide high thermal conductivity. Many of these engines operate in a temperature regime where the Newtonian cooling law describes the predominate heat delivery mechanism $Q=h \times A \times \Delta T$, where h=heat transfer coefficient (100 W/m$^2$K for force convection air). At a 1000° C. temperature differential, approximately 100 Kw/m$^2$ can be convectively delivered to a conductive receiving surface. Therefore, these engines are very limited, and would require very large rotating heat absorption surfaces. For example, an automotive engine of 30 Kw operating at 30% thermal-to-work efficiency would require 1 m$^2$ of emitter/absorber surface areas. The need for this overly large rotating heat absorption structure has prevented the development and deployment of this type of engine.

Additionally, rotating heat engines/heat pumps do not completely utilize the rotating nature of the engine/heat pump. For example, synergy has not been developed between output waste heat and the possible uses of the energy contained in the waste heat output, and the combined thermodynamic cycle capability of the rotating engine/heat pump has not been developed and exploited. There is some mention of incorporating fins or blades to help move the external cooling fluid through the engine, however, the idea of using the rotating heat rejecter structures to produce thrust has not been developed. Accordingly, a rotating heat engine that incorporates heat rejecters capable of using a predetermined portion of the rotative energy to develop thrust, preferably combined with the expansive force of a heat rejection fluid, would further the development and deployment of a rotary heat engine.

If a rotating engine is to be of practical value it must be manufacturable, cost effective, and have a volume and mass power density that permits its use in typical applications, such as, automotive, aerospace, commercial, and industrial applications. To fulfill these requirements, energy must be transformed, delivered, and made to do work at a rate that compares favorably with traditional engines.

SUMMARY OF THE INVENTION

An energy conversion device that may use multiple sources of energy, may utilize multiple thermodynamic cycles, may be quiet when running, may be made from readily available materials, may be compact and energy efficient, and/or may be made in a variety of speed torque curve characteristics is provided.

For example, such an energy conversion device may include a heat absorber having a working fluid therein, a power converter in fluid communication with the heat absorber, and a heat rejecter in fluid communication with each one of the heat absorber and the power converter. The device may also include an energy source to provide energy to the heat absorber. In some embodiments the heat absorber, the power converter and the heat rejecter may be connected together to rotate as a single rotary unit relative to a shaft. In other embodiments the heat absorber and the heat rejecter may rotate relative to the power converter.

In all embodiments, the energy conversion device may include several features to increase the device's efficiencies. For example, the device may be made more efficient by utilizing an energy source that provides radiant energy to the heat absorber, by utilizing a segmented energy source that may have a plurality of segments, wherein each segment may be either activated or deactivated to deliver the radiant energy to the heat absorber, by utilizing the waste heat produced by the device to create additional work, and/or utilizing multiple thermodynamic cycles. These features may be implemented individually, or in combination with each other to increase the device's efficiencies.

DETAILED DESCRIPTION OF ILLUSTRATIVE EMBODIMENTS

The invention generally relates to devices capable of use in heat to mechanical energy, and mechanical energy to heat pumping processes. In particular, the below-described energy conversion device may be used in a variety of applications, such as where gasoline, diesel, steam, and turbine type engines are now used. Unlike the engines/heat pumps of today, however, the energy conversion device is capable of absorbing and rejecting heat energy in a more efficient manner due to several features such as the rotating nature of the device, the use of radiant energy, the use of waste heat, and/or the combination of thermodynamic cycles utilized, for example.

Figure 1:
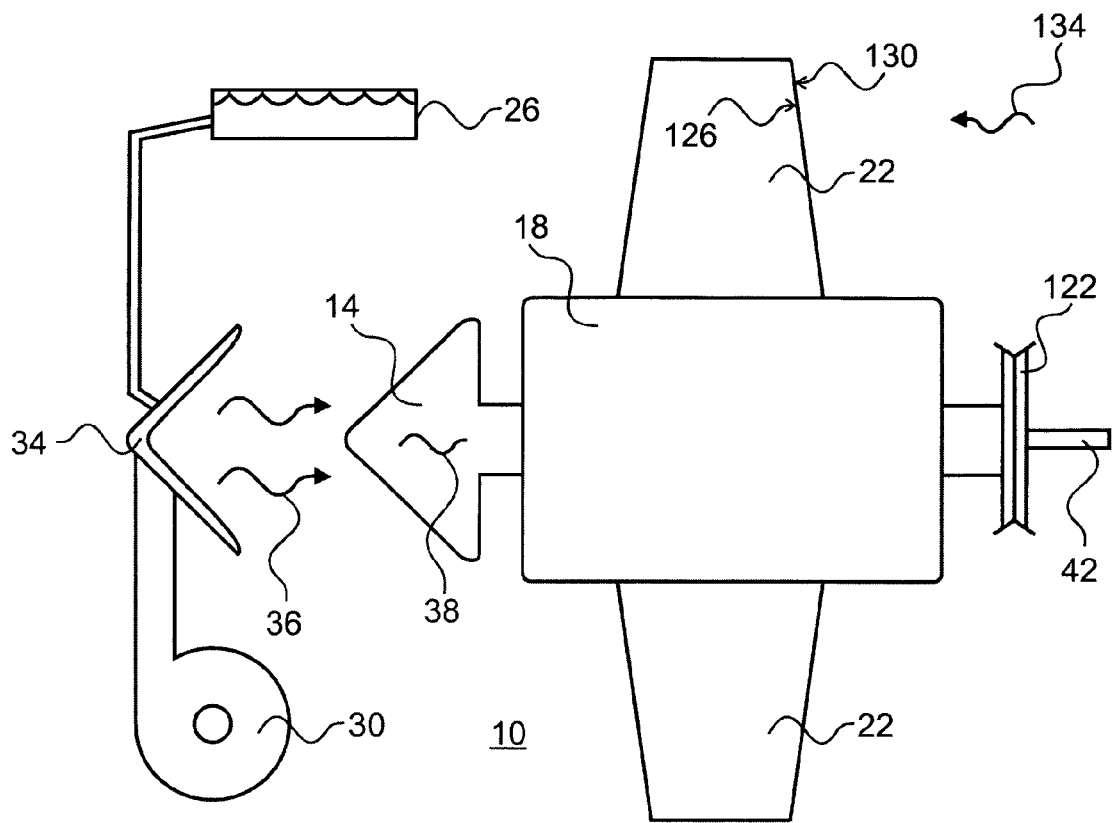
FIG. 1 is a schematic illustrating a rotary energy conversion device.

As shown in FIG. 1, an energy conversion device 10 may include a heat absorption unit 14, a power converter 18, and a heat rejection unit 22. Fuel 26 and air 30 may be combined in a primary energy source 34 such as a combustor to create heat energy 36. The heat energy 36 is received by the heat absorber 14 where a working fluid 38 expands and does work in the power converter 18. Heat, not converted to work may be dissipated in the heat rejection units 22. In some embodiments the heat absorber 14, the power converter 18 and the heat rejecter 22 are connected together to rotate as a single rotary unit relative to a shaft 42. In other embodiments the heat absorber 14 and the heat rejecter 22 may rotate relative to the power converter 18.

The heat energy 36 may be transformed, delivered, and made to do work at a rate that compares favorably with traditional engines. For example, by using thermal radiation as the primary heat delivery vector, a greater work output can be generated. Preferably the heat energy 36 delivered may be at least 51% radiant energy. Even more preferable, the energy delivered may be at least 70% radiant energy. The Stefan-Boltzman equation defines the parameters of radiant heat flow:

$$H_{net} = \epsilon(T) \times \sigma \times A \times (T_H^4 - T_L^4)$$

Where $\epsilon(T)$ is emissivity, $\sigma$ is the Stefan-Boltzman constant, A is the surface area, $T_H$ is the temperature of the emitting surface, and $T_L$ is the temperature of the receiving surface. According to the equation, an automotive engine operating at a 1000° C. differential between emitter surface and heat absorber surface would only require a heat absorber surface area of 0.35 m². Also, as shown by the equation, as emission temperatures are increased, the necessary receiver and emitter surface areas are decreased exponentially. Accordingly, radiant heat transfer provides the means to create a rotating engine with a competitive power density to other engines. The heat energy 36 may result from a process such as combustion of a fuel and an oxidant, solar radiation, and radiation emanating from a radioactive material, for example.

Additionally, by using radiant energy the combustion process may be better controlled. For example, forced convection requires high flow rates to increase heat transfer rates and large heat transfer structures which may introduce thermal inertia. Radiant energy may be produced by the stoichiometric combustion of air or oxygen and fuel. This may lower the exhaust gas flow rate. The primary energy source 34 may be made from various materials such as micro-porous ceramics, woven or fiber type materials, and catalysts may optimize combustion and improve emissivity and spectral radiance.

Figure 2:
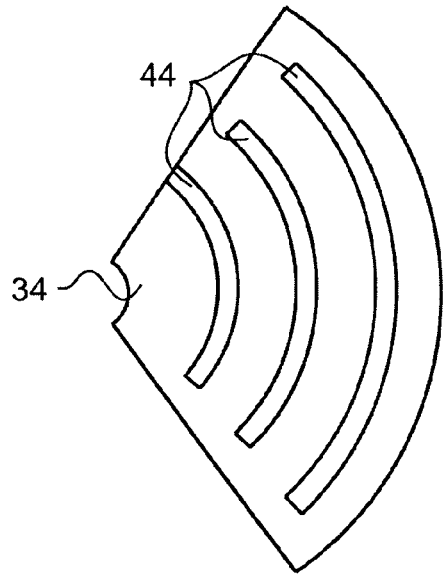
FIG. 2 is a schematic illustrating a segmented primary energy source.

As shown in FIG. 2, the primary energy source 34 may be a segmented radiant energy source having a plurality of segments 44 implemented to surround the heat absorber 14. If the engine is to be operated at multiple power and speed settings, the segments 44 may be activated and deactivated to correspond to energy input requirements. The entire emitter surface may be divided so that quantum energy levels are available. Each quanta may either be off or operating at maximum efficiency. Each segment 44 may be optimized to support complete combustion at lower than NOx producing temperatures. As the heat absorber 14 rotates, all areas may be irradiated equally regardless of combustion setting.

The segments 44 may have interleaved back channels designed to separately introduce fuel and oxidizers into the primary energy source 34. Alternatively, fractal fluid dynamics software may be used to optimize delivery and mixing of the combustion components. Combustion may take place primarily at the emitter surface or incrementally from the back to the surface. Channels may also be provided for the exit of combustion products.

Figure 3:
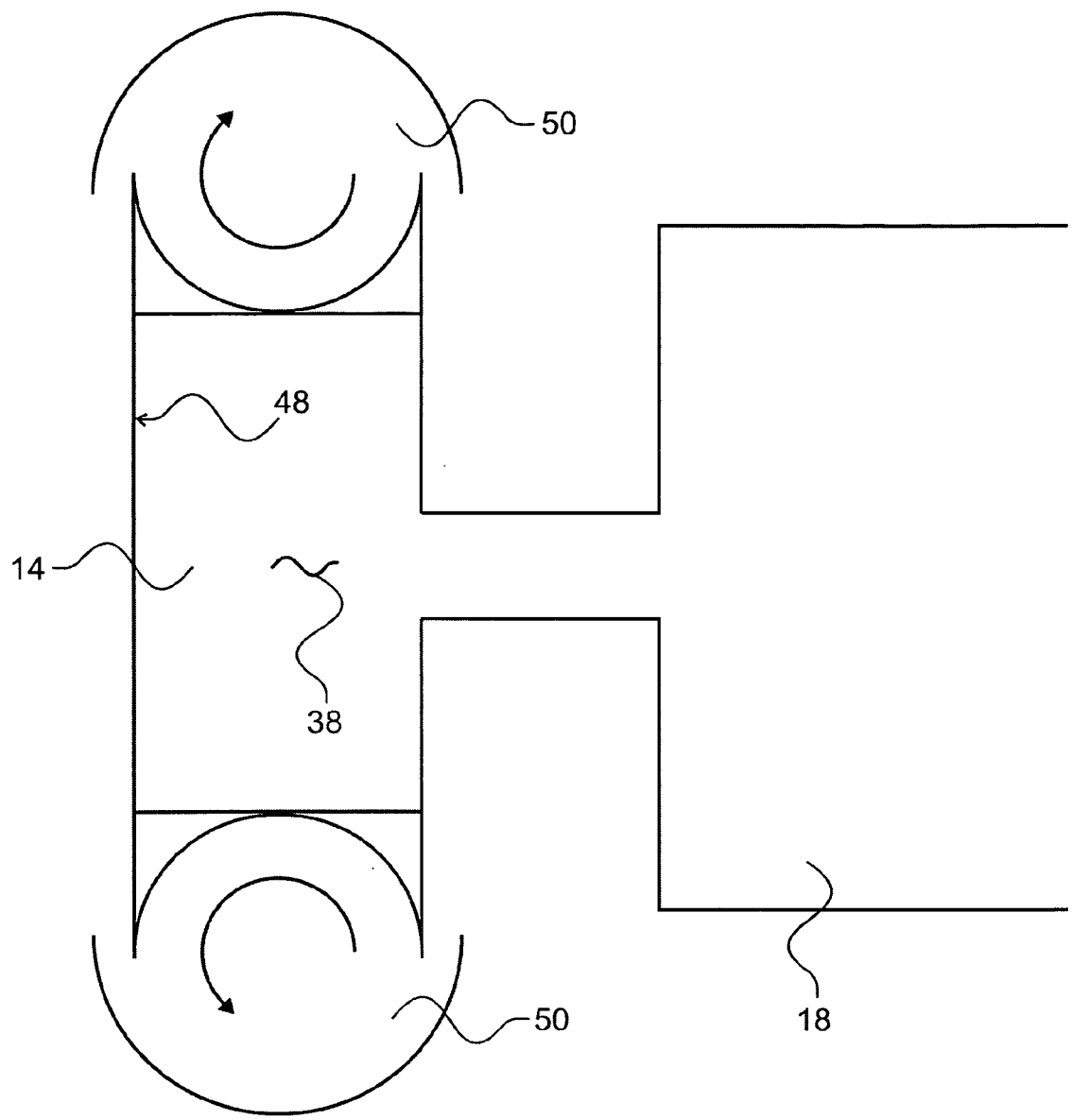
FIG. 3 is a schematic illustrating a heat absorber having a regenerative blower configuration.

The heat absorber 14 may have a variety of designs that help optimize the heat transfer process. For example, as shown in FIG. 3, a surface 48 of the heat absorber 14 may be smooth to reduce turbulence, or may contain surface features that help move combustion products out of the system. The absorber surface 48 may have concavities that promote micro implosions thereby maintaining surface cleanliness. Heat absorber and heat rejecter surfaces may be coated with materials that increase heat flux or promote boiling or condensation Micro frits and diamond-like coatings are examples of coating techniques. In embodiments where forced convection is the primary method of heat transfer, the device 10 may be made practical by utilizing a regenerative blower 50 arrangement to provide multiple convective pathways for the external heating fluid. Also, the heat absorber 14 may have surfaces that perform the separate functions of liquid vaporization and vapor superheating. The heat absorber 14 may have spectral selective surfaces tuned to match the spectrum of the emitter.

The heat absorber 14 may be contained within a volume having a spectrally transparent window. Heat resistant silica glass, high temperature glass ceramic, and quartz pure glass, as well as other materials may be used as windows. The heat absorbing material behind the window may be fibrous, corrugated, conical, or hemispherical, and may have mini to micro channels designed to distribute the condensed working fluid 38 in a manner that may minimize hot spots and flow resistance.

The heat absorber 14 may be made of any material having the conductivity and mechanical characteristics necessary for the intended pressures and temperature range. The heat absorber 14 may be transparent to radiated energy, and the unit may have a heat absorbing media inside, that converts the radiant energy to heat, and transfers that heat to the working fluid 38. This arrangement allows for a much faster heat transfer rate change than a heat absorption unit that relies on conduction.

There are a number of working fluids 38 that may be used. For example the working fluid 38 may be a gas, a super critical fluid, a phase change material or a binary fluid. Working fluids 38 that exist as a liquid at the heat rejection temperature and pressures allow for better regenerators and superior heat absorption rates. The working fluids 38 are selected to match the operating conditions of the engine or heat pump. Water, alcohol, butane, propane, hydrogen, super critical carbon dioxide, proprionic acid, and binary fluids are possible fluids 38. Also, refrigerants, organic fluids, and lubricants commonly used in refrigeration, heat pump, and freezer applications may be used as working fluids 38 in the energy conversion device 10 in both heat pump and engine formats.

The power converter 18 may be connected to and in fluid communication with the heat absorber 14. The power converter 18 may have multiple configurations. For example, the power converter 18 may include axial pistons, radial pistons, or turbines that are driven by the working fluid 38. The power converter 18 is not limited to such structures and may include other structures that may be driven by the working fluid 38. The power converter 18 may incorporate such structures in a number of embodiments to convert the heat energy into work.

Figure 4:
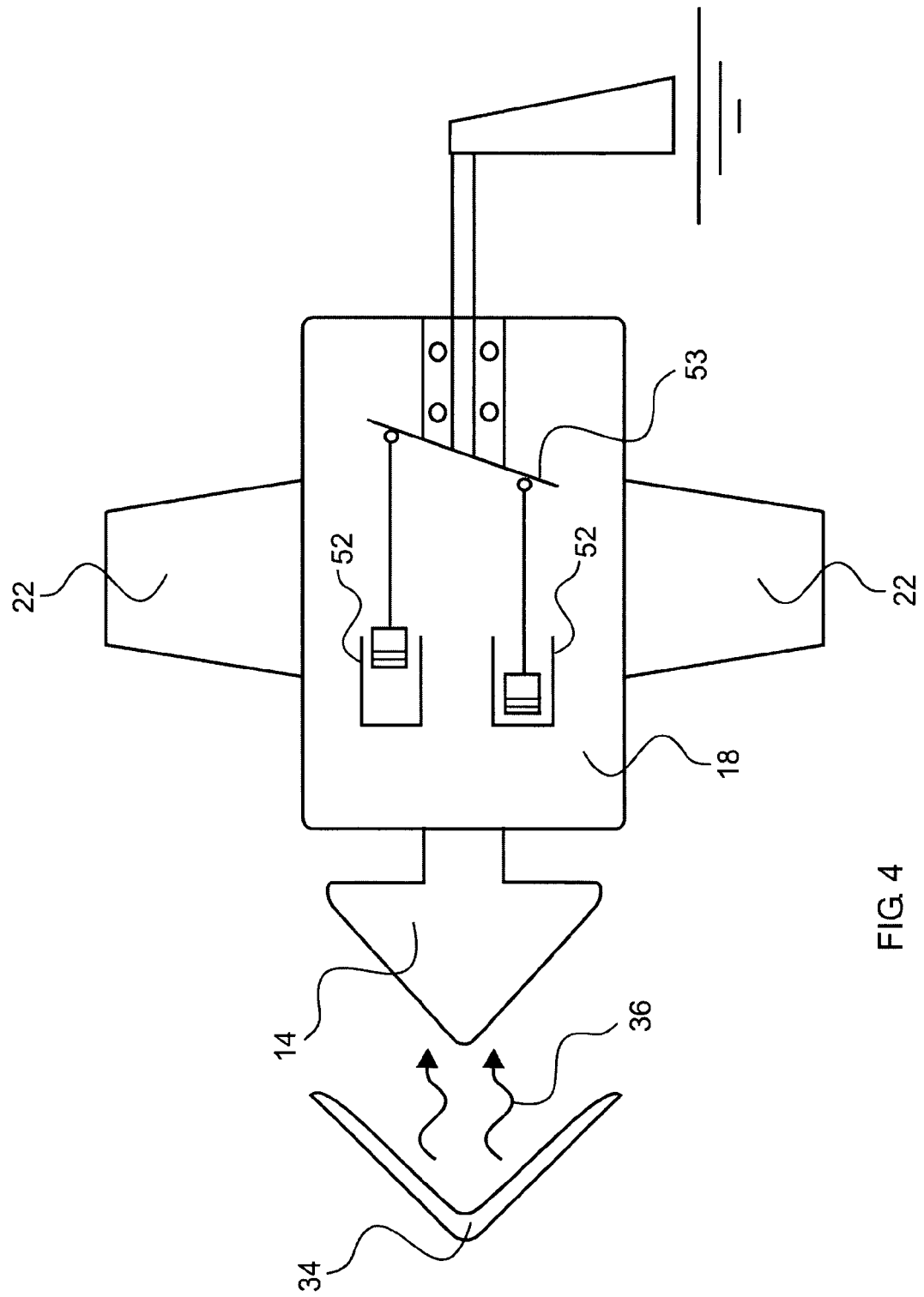
FIG. 4 is a schematic illustrating an en energy conversion device having a piston driven power converter.

For example, FIG. 4 illustrates an embodiment of the power converter 18 having pistons 52 driven by a swash plate 53.

Figure 5:
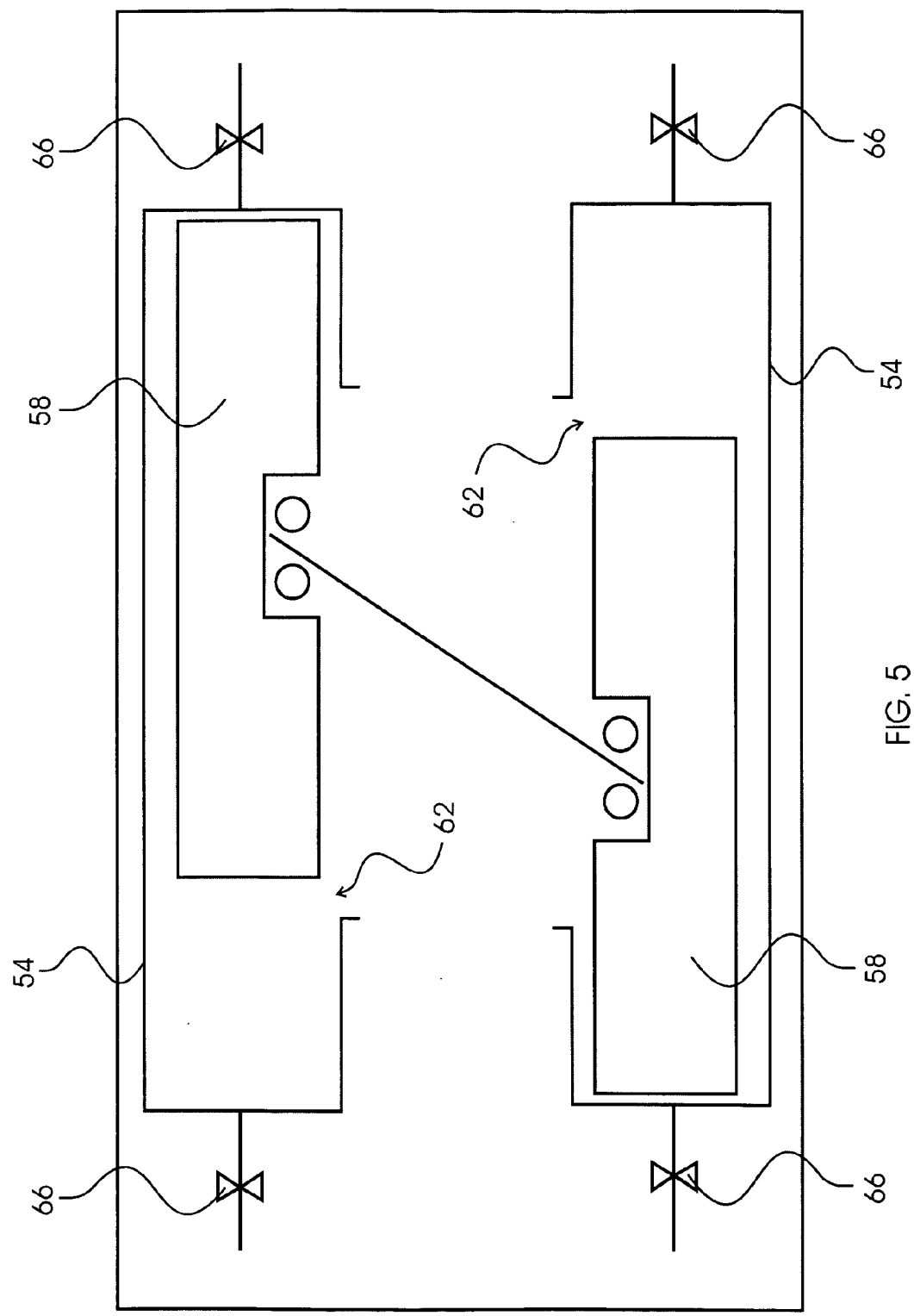
FIG. 5 is a schematic illustrating a power converter configured with a uni-flow design.

FIG. 5 illustrates the power converter 18 having a uni-flow design. As shown, the uni-flow engine may include a piston cylinder 54 containing a power piston 58 and an exhaust opening 62 substantially at its center. The uni-flow system may also include two inlet valves 66 located at each end of the piston cylinder 54. Vapor may be admitted at either one of the inlet valves 66, thereby driving the power piston 58 and then exit at the central opening 62. In the uni-flow design, thermal efficiency is achieved by having a temperature gradient along the cylinder 54. Vapor may enter at the hot end of the cylinder and may exhaust at the cooler center. By this means, cyclic heating and cooling of the cylinder wall may be avoided. One advantage of the uni-flow system is that it potentially allows for greater expansion in a single cylinder, which may allow for greater thermal efficiency.

Figure 6:
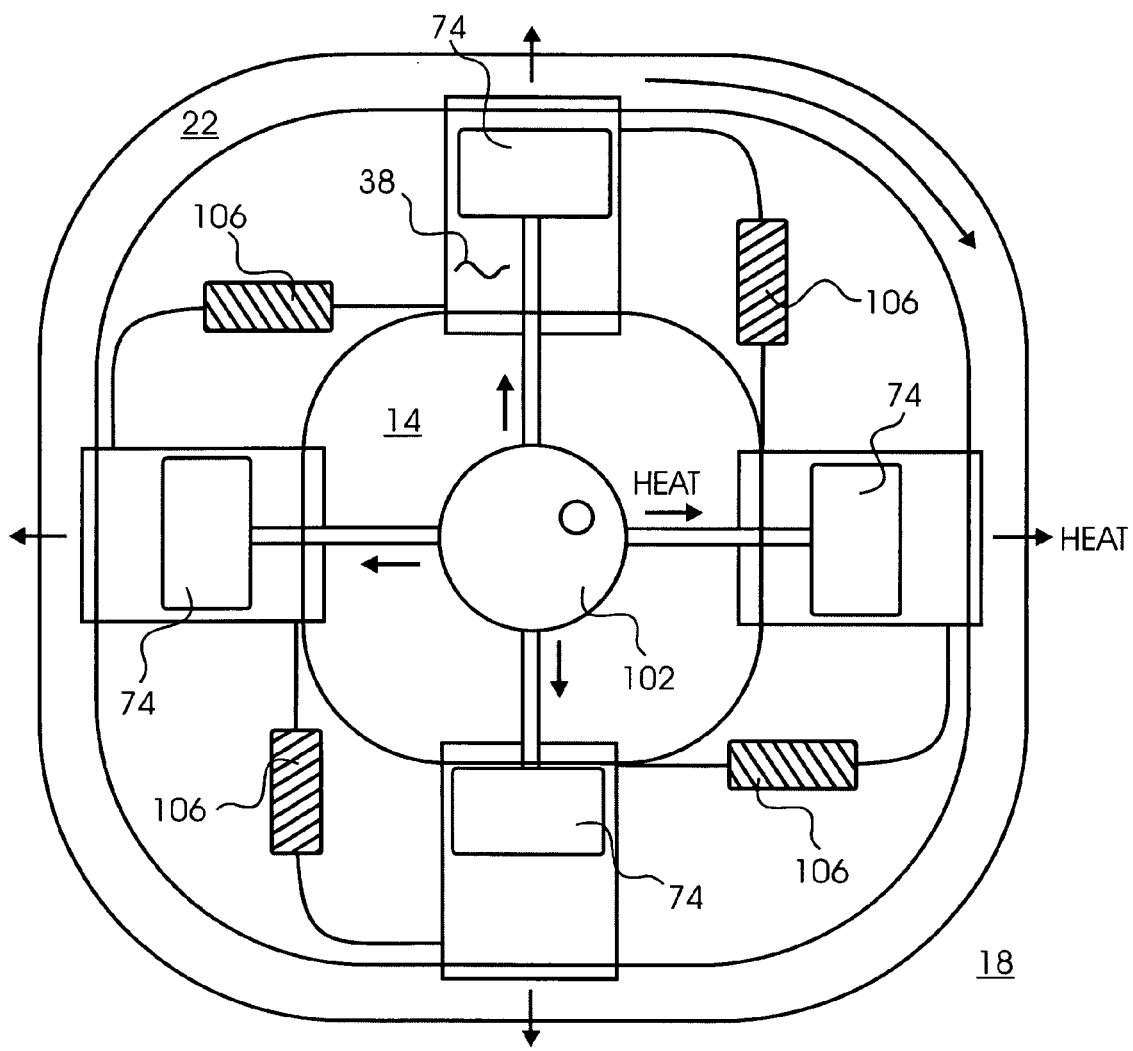
FIG. 6 is a schematic illustrating a power converter configured as an alpha type Stirling engine.

FIG. 6 illustrates the power converter 18 having an Alpha type Stirling engine design. As shown, such an engine/heat pump may have a heat absorbing end 14, a heat rejecting end 22, regenerators 106, piston/cylinder assemblies 74, and mechanical connection 102. The device may be arranged in radial fashion as shown, or may have pistons/cylinders arranged coaxial to the central shaft. The heat absorbing end 14 and the heat rejecting end 22 may form annular areas, or in the axial configuration may be at opposite axial positions. The working fluid 38 may move back and forth between the heat absorbing end 14 and the heat rejecting end 22 of adjacent piston/cylinder assemblies 74 which are mechanically connected 90 degrees out of phase as in typical Alpha type Stirling devices. The heat absorbing 14 and heat rejecting 22 ends of the device may interact with external fluids as will be described.

Figure 7:
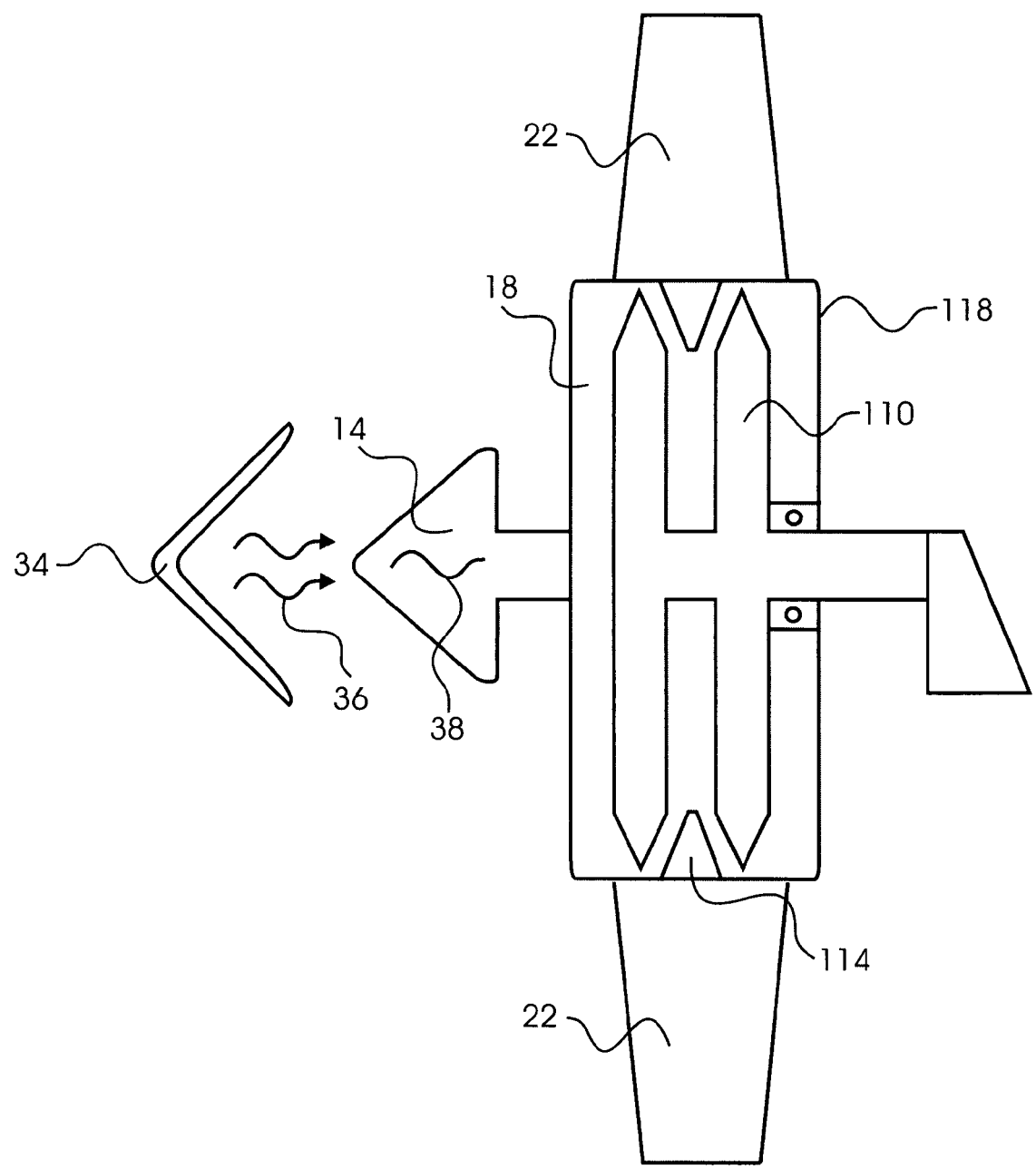
FIG. 7 is a schematic illustrating an energy conversion device with a turbine driven power converter.

FIG. 7 illustrates the power converter 18 having a turbine type design. As shown, such a turbine may have stationary components 110 and rotating components 114 encased in a housing 118. It should be understood that the turbine type designs may include turbine blades or may be bladeless such as a Tesla-type turbine.

The forgoing configurations of the power converter 18 were for illustrative purposes only. Therefore, the power converter 18 may include other configurations that enable the energy conversion device 10 to produce work from the working fluid 38 such as a nutating disc for example.

Referring back to FIG. 1, mechanical work produced by the power converter 18 may be delivered by a drive 122 to a differential which may be attached to the driving wheels for certain embodiments of the device. The drive 122 may include a pulley, a gear, a sprocket, an electric generator component, a fan, an impeller, a propeller or any other component capable of delivering the rotational energy. The components of the drive 122 may depend on the embodiment of the device.

Figure 8:
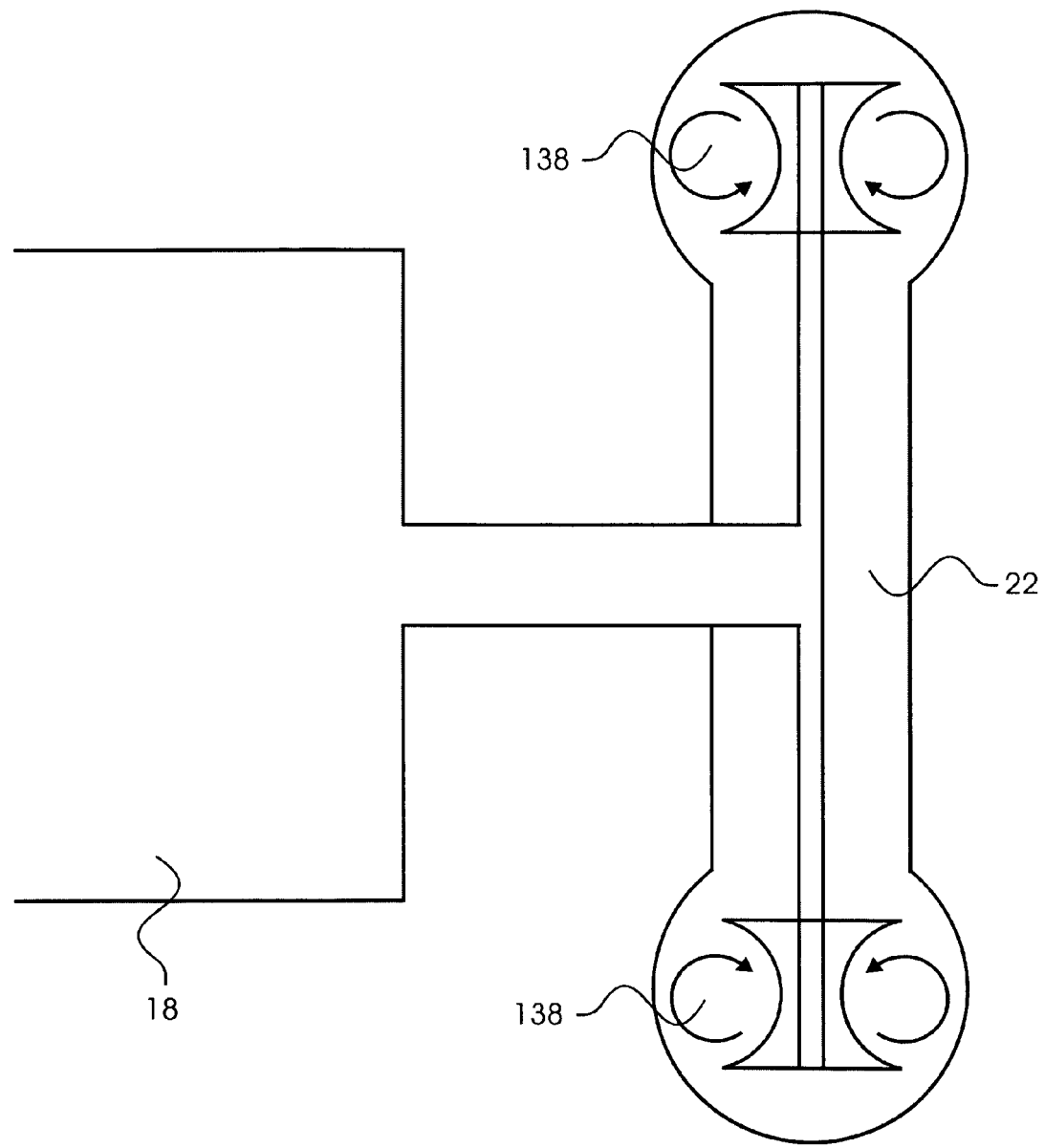
FIG. 8 is a schematic illustrating a heat rejecter having a regenerative blower configuration.

As illustrated in FIG. 1, the heat rejecter 22 may be connected to and in fluid communication with both the power converter 18 and the heat absorber 14. The heat rejecter 22 may have an internal surface 126 for contacting the working fluid 38 and an external surface 130 for contacting a cooling fluid 134. The cooling fluid 134 may be air or water or a process fluid for example. The internal surface 126 may include channels, micro-channels, vanes, or an expansion chamber. Because the energy conversion device 10 may be designed to operate in a variety of environments, the external surface 130 of the heat rejecter 22 may take different forms and have different geometries. For example, a device designed primarily to produce torque will have heat rejecters 22 that are oriented to produce the least aerodynamic or fluid drag while still rejecting the requisite amount of heat to the environment. A device designed to produce both torque and thrust may have heat rejecters 22 that accelerate the external cooling fluid 134, thus dividing the work output of the engine between thrust and torque. If the device is designed to act as a heat pump, the heat rejection 22 and heat absorbing structures 14 would serve both to transfer heat and to accelerate the environmental fluids making up or in contact with the high and low temperature sides of the heat pump. The rejecter surface may have concavities that produce micro implosions, thereby maintaining surface cleanliness and mechanically producing heat. The rejecter surfaces should be oriented to sling condensate off the surface as soon as it forms. Thus heat rejecter surfaces should be substantially perpendicular to the axis of rotation. In embodiments where forced convection is the predominate heat transfer mechanism of the heat rejecter 22, a regenerative blower 138 arrangement as shown in FIG. 8, may be used to provide multiple heat transfer paths for the cooling fluid 134. The regenerative blower 138 can also produce an enhanced pumping effect. If the device is designed to act as a pump, the heat rejection 22 and heat absorbing 14 structures would serve both to transfer heat and to accelerate the environmental fluids.

High efficiency of the device may further be improved by using the waste heat generated by the energy-to-work process. The waste heat may contain 60-85% of the fuel energy. The rotating heat rejecter 22 may accelerate the cooling fluid 134 past the engine, thereby increasing the temperature of the cooling fluid 134. By increasing its temperature, the volume of the cooling fluid 134 may increase and accelerate the cooling fluid 134 as it exits the device. The thrust created, may help counteract drag forces or may otherwise contribute to the energy output of the device.

Figure 9:
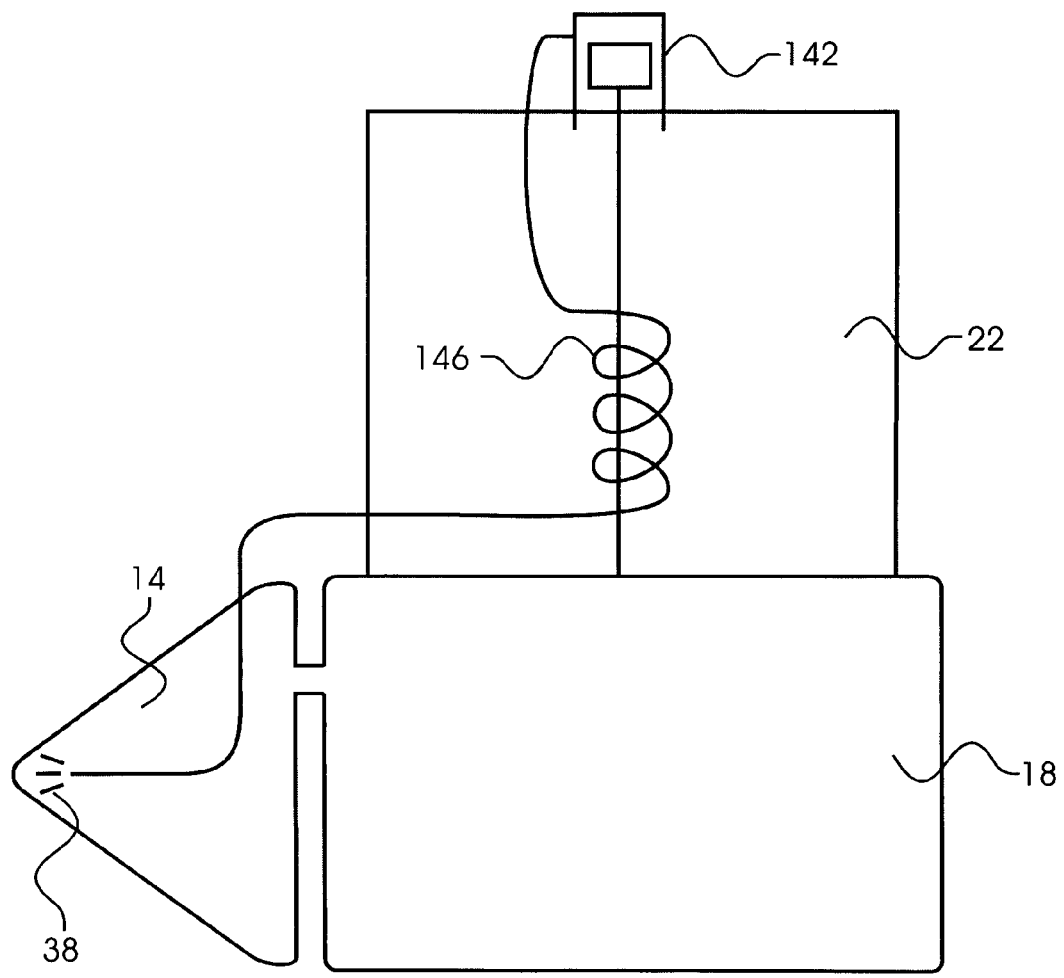
FIG. 9 is a schematic illustrating an energy conversion device utilizing circulating pumps.

As illustrated in FIG. 9, the heat rejecters 22 may include circulator pumps 142. Circulator pumps 142 may also be used to circulate the working fluid 38. These preferably piston type pumps may be located at points radially distant from the axis of rotation in the heat rejecters 22. The cooled working fluid 38 may be forced by centrifugal action to the inlets of the circulating pumps 142. The pumps 142 may be operated via a linking mechanism by action of a shaft mounted cam or eccentric co-located on the stationary reaction member, or by other mechanical, electrical, or hydraulic methods.

As shown in FIG. 9, the circulating pumps 142 may deliver the working fluid 38 from a low pressure recuperating heat exchanger 146 to the high pressure heat absorption unit 14. The heat exchanger 146 may absorb some of the waste heat from the working fluid 38 exiting the power converter 18. After cooling in the heat rejection unit 22, the working fluid 38 may reabsorb some of the heat held in the heat exchanger 146 before being delivered to the heat absorption unit 14. The heat exchanger 146 preferably may have a surface area to volume ratio of at least 10:1, more preferably 100:1, and even more preferably 1000:1. The micro scale features may have surface area to volume ratios of up to 5000:1. Heat recuperation at theses stages of the engine operation may provide significant efficiency gains similar to those achieved by Stirling engine and stationary Rankine cycle electric generator applications.

When the phase change working fluid 38 is employed, the liquid phase material may be forced by centrifugal force against the interior surface of the heat absorber 14 and the heat rejecter 22. This may prevent the formation of micro bubbles of vaporized fluid. In conventional heat absorber and heat rejecter structures these micro bubbles act as insulators, preventing the flow of heat from the heat absorber and heat rejecter structures into the working fluid. By implementing a rotating heat absorber 14 and heat rejecter 22, the environmental heat exchange fluids (i.e. air, water, combustion gases) may also move through the engine with greater ease. This may eliminate fans and radiators associated with conventional engines.

Zeolites or other adsorbents may be placed within the system to sequester the working fluid 38 during idle periods. This would prevent freezing of the working fluid 38.

Figure 10:
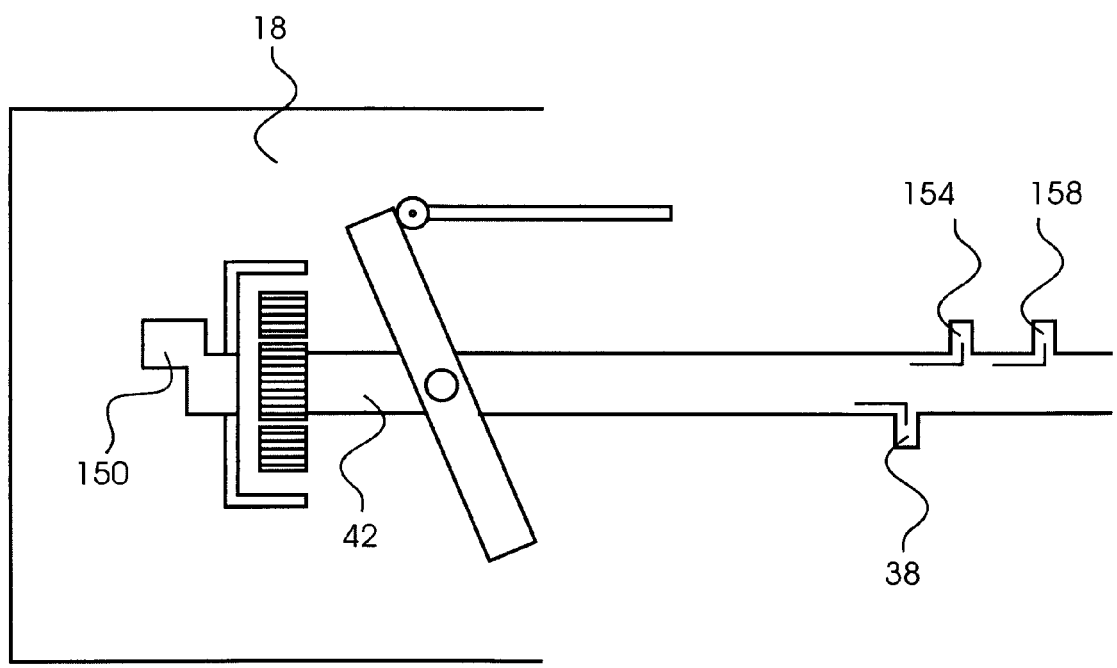
FIG. 10 is a schematic illustrating a shaft for an energy conversion device.

As illustrated in FIG. 10, the shaft 42 may provide the mounting structure for the rotating components, as well as the support structure for a reaction member 150. The shaft 42 may include inlet 154 and outlet 158 passageways for hydraulic fluid pumped from the interior of the engine; passageways for the admittance of the working fluid 38; valve mechanism controls; a swash plate; swash plate angle controls; lubrication passageways; coolant passageways; and, electrical conduits. The shaft 42 may be connected to the reaction member 150 through a gear train, magnetic coupling, torque converter, viscous coupling, etc. The reaction member 150 may be located inside the energy conversion device, and may take the form of a crank shaft, scotch yoke shaft, cam, eccentric, generator component, lobed rotary engine component, turbine component, gear pump component, or other component of a heat energy conversion device, including but not limited to magneto hydrodynamic components, particle transport energy components, electrostatic components, and electromagnetic components.

Figure 11:
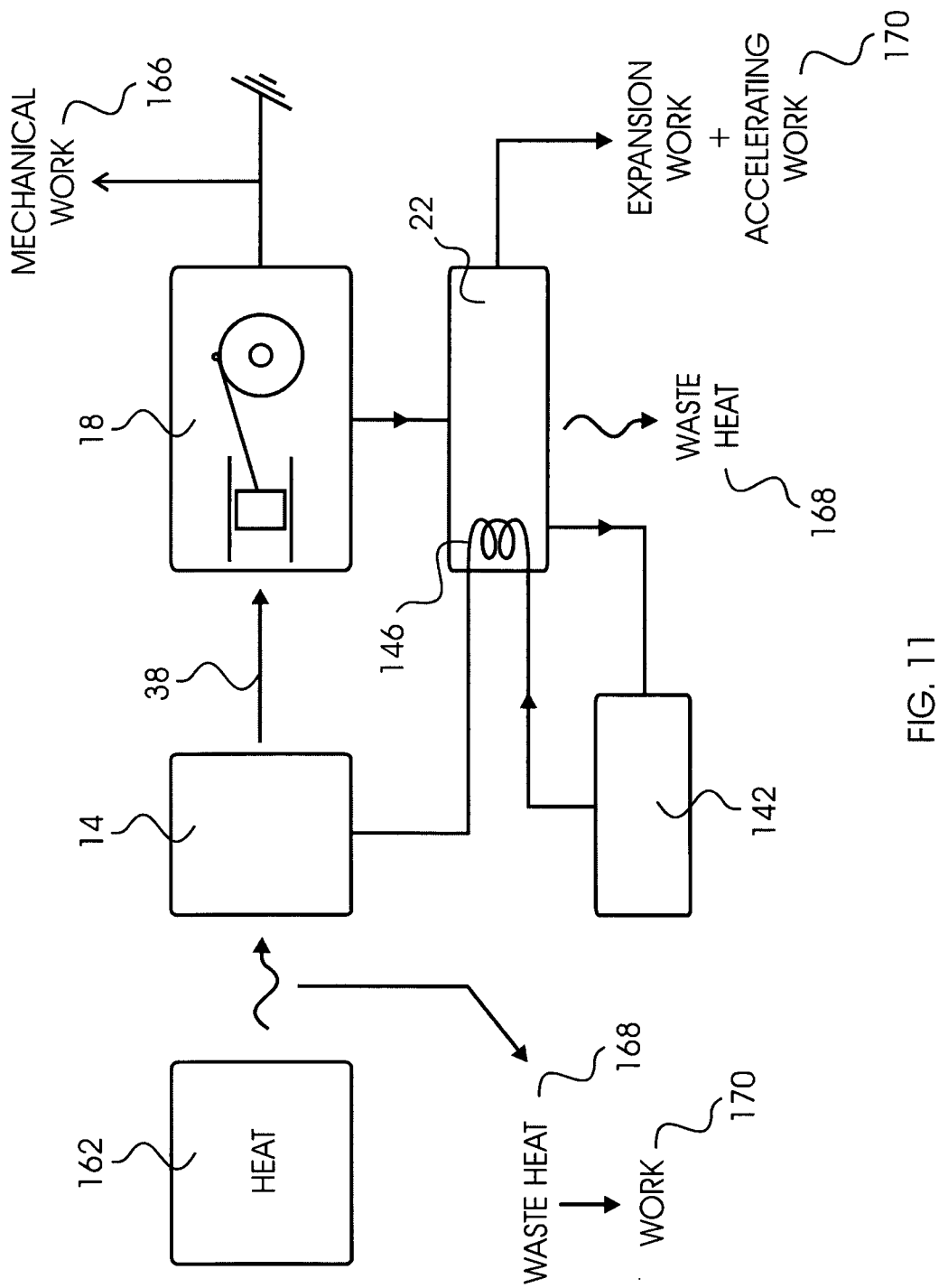
FIG. 11 is a schematic illustrating the various processes utilized in an energy conversion device.

FIG. 11 illustrates the various processes that may be utilized in the energy conversion device 10. As illustrated, heat energy 162 may be delivered to the heat absorber 14 causing the working fluid 38 to do work on the power converter 18. The power converter 18 may convert the heat energy 162 into mechanical work 166. The working fluid 38 may then be forced against the interior wall of a heat rejecter 22 where the circulating pump 142 may re-circulate the working fluid 38 through the heat exchanger 146 and back into the heat absorber 14. The rotating nature of the heat rejecter 22 may accelerate a cooling fluid. Waste heat 168 may expand the cooling fluid thereby doing work 170 on the cooling fluid and further accelerating the cooling fluid.

Figure 12:
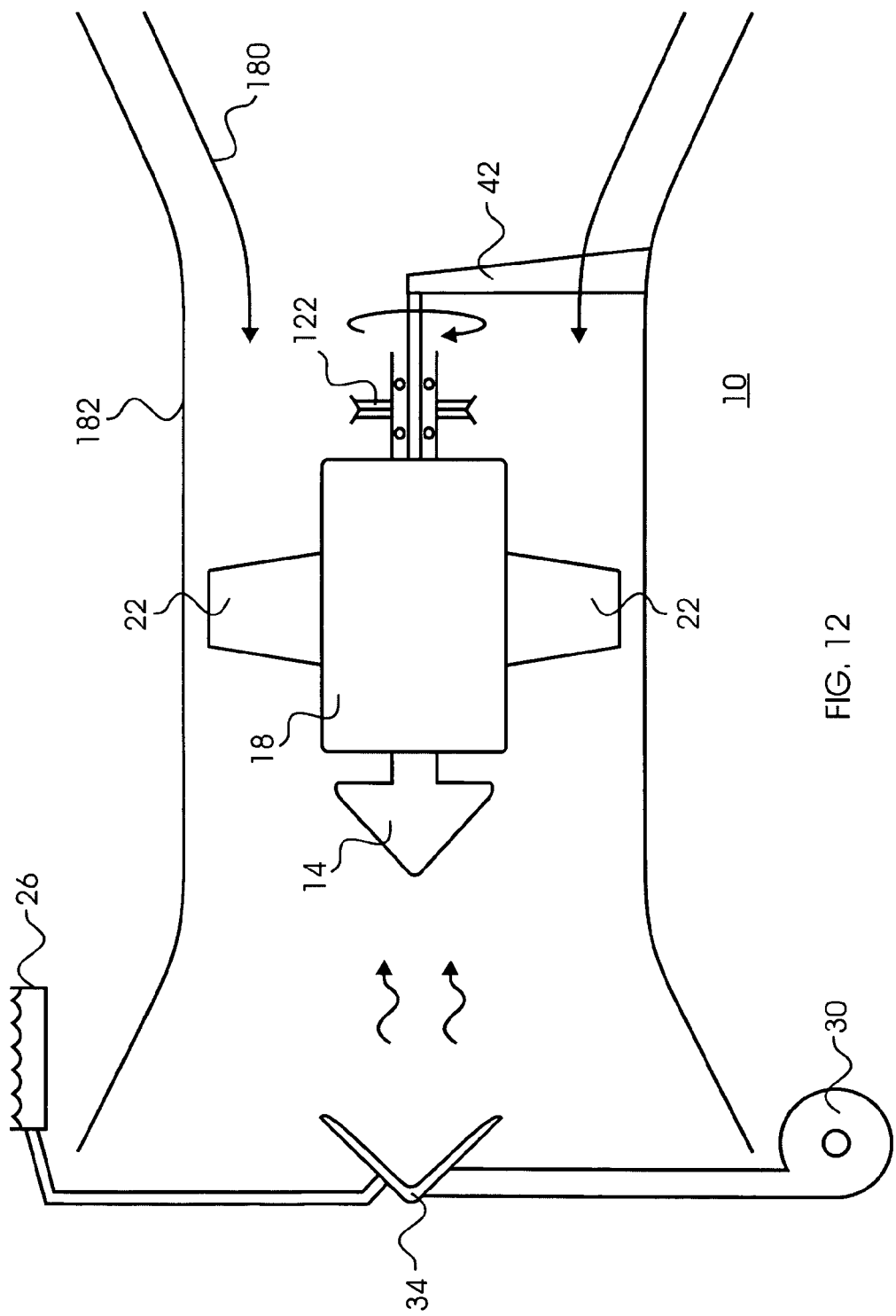
FIG. 12 is a schematic illustrating an energy conversion device configured to deliver both a tractive effort and thrust.

FIG. 12 illustrates an embodiment of the energy conversion device 10 providing both a tractive effort and thrust. As shown, waste heat may be directed to the heat rejecters 22, where air 180 passing past vanes, may absorb the heat and expand thereby creating thrust in a nozzle 182. The rotational energy created by the power converter 18 may be delivered by the drive 122 to the differential which may be attached to the driving wheels of the automobile. Accordingly, the energy conversion device 10 may be designed such that heat energy is converted to propel the vehicle mechanically, electrically, or hydraulically through the wheels, and the waste heat may be used to produce thrust via the air stream.

Figure 13:
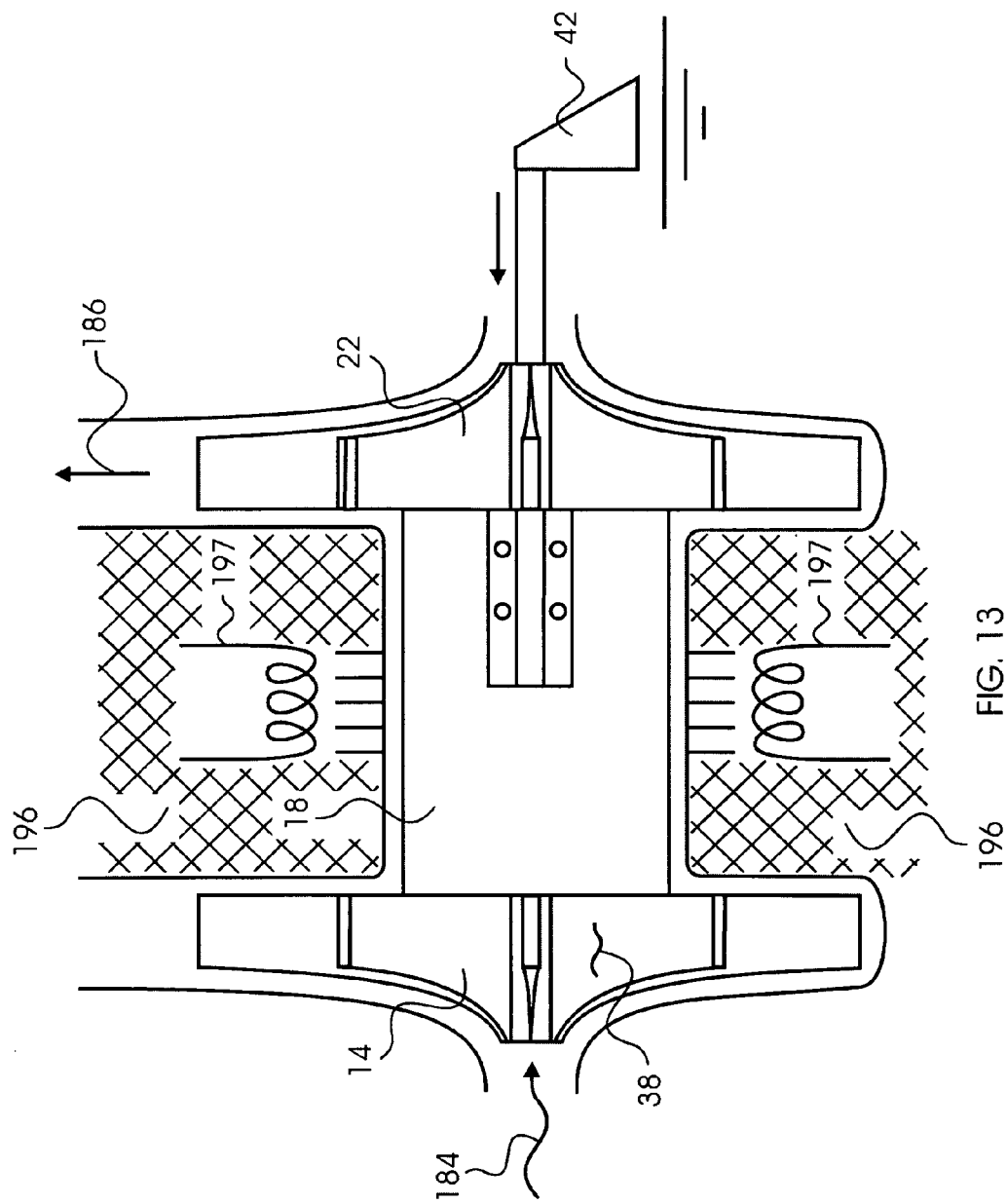
FIG. 13 is a schematic illustrating an energy conversion device configured to be a heat pump.

FIG. 13 illustrates an embodiment of the energy conversion device as a heat pump. In this case, air 184 may be drawn through the heat absorber 14 where it may boil working fluid 38 and reduce the temperature of the air stream passing over it. The power converter 18 may compress the working fluid 38 and deliver the compressed fluid to the heat rejecter 22, where the now compressed fluid may condense and reject heat 186 to the air. The shaft 42 may act as a mounting mechanism. An insulated panel 196 may separate the heat absorber 14 and the heat rejecter 22. This embodiment of the energy conversion device 10 may combine the compressor, fan, and heat exchange functions of a traditional heat pump into one unit and may form a very compact unit for window mounting. Conversely this embodiment of the energy conversion device 10 may use a gas as the working fluid 38. This embodiment of the device may be used to recoup ventilation or process energy normally wasted and may simultaneously maintain a physical separation of fluid streams where prevention of cross contamination may be required, while allowing thermal communication. The device may extract energy via electrical converter 197 for fluid streams having different temperatures, or the device may use energy via electrical converter 197 to extract energy from one fluid stream and deliver it to another. The electrical converter 197 may be a motor or a generator for example.

Figure 14:
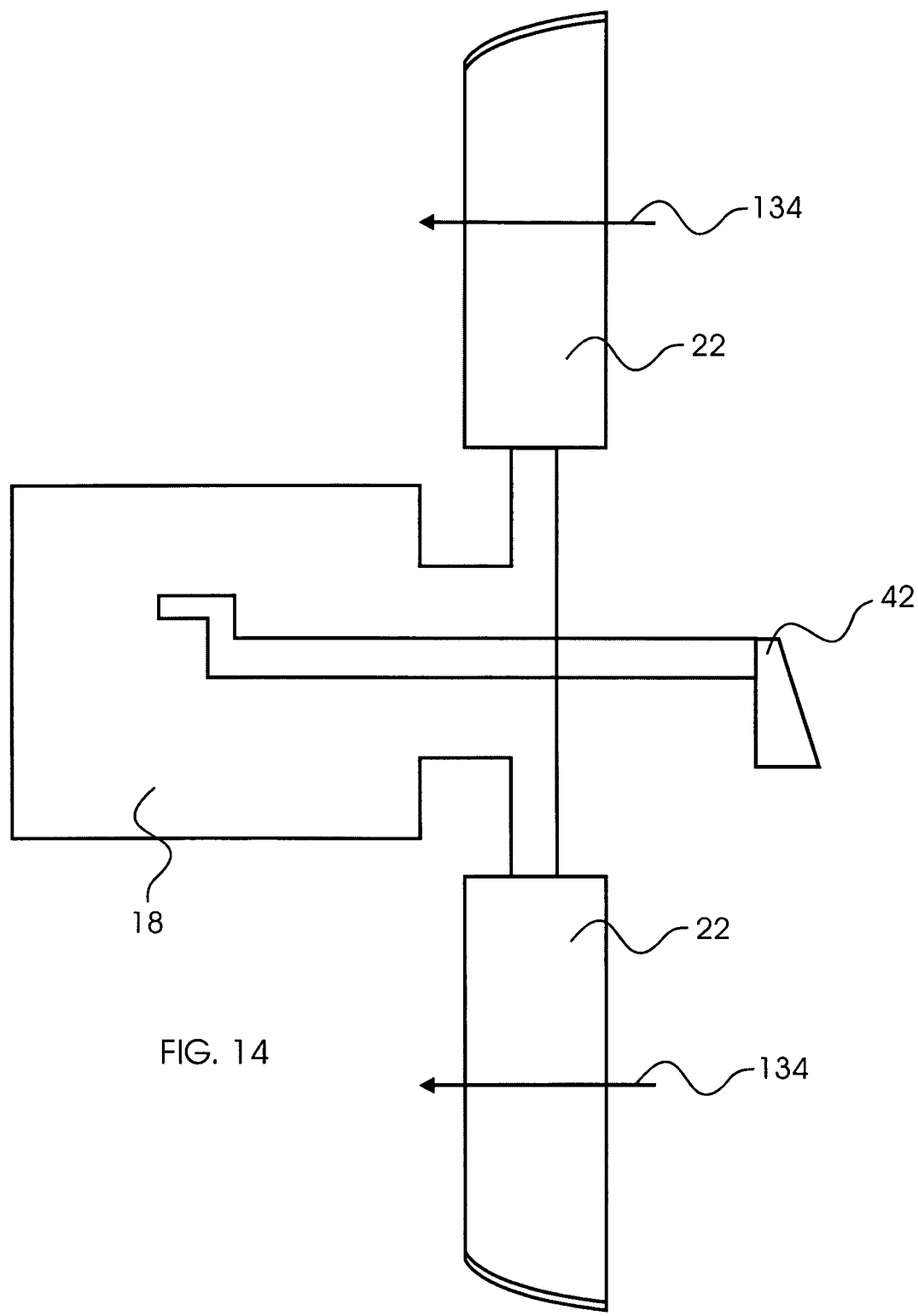
FIG. 14 is a schematic illustrating an energy conversion device configured to accelerate air.

FIG. 14 illustrates an embodiment of the energy conversion device 10 providing thrust using air as the accelerated cooling fluid 134. In such an embodiment the heat rejecter 22 may have a fin-like, a propeller-like or airfoil-like shape, and because of its rotation, the heat rejecter 22 may accelerate the cooling fluid 134 in the direction indicated. Such an energy conversion device 10 may be useful in vehicles such as light aircrafts, unmanned aerial vehicles where noise must be kept to a minimum, airboats, hovercrafts, and ground effect vehicles for example.

Figure 15:
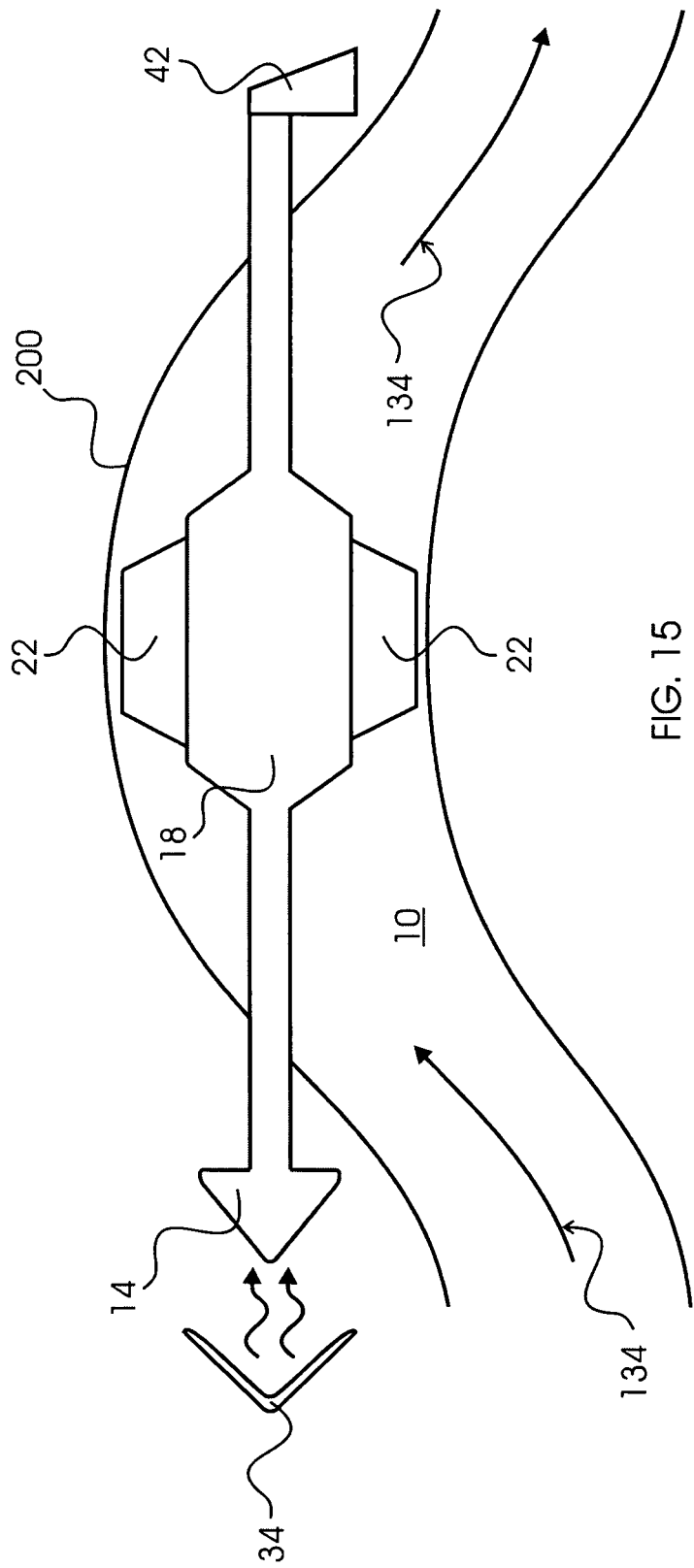
FIG. 15 is a schematic illustrating an energy conversion device configured to accelerate water.

FIG. 15 illustrates an embodiment of the energy conversion device 10 providing thrust using water as the accelerated cooling fluid 134. Operation of this embodiment of the energy conversion device 10 is similar to that of the device in FIG. 14 except that the heat rejecter 22 may be ducted with a duct 200. The duct 200 may not only channel the fluid flow, but may also allow the fluid expansion to be converted into thrust. In the embodiment depicted, the energy conversion device 10 may be used to perform several functions such as to propel a boat with a significantly diminished noise level, or act as a pump for example.

Figure 16:
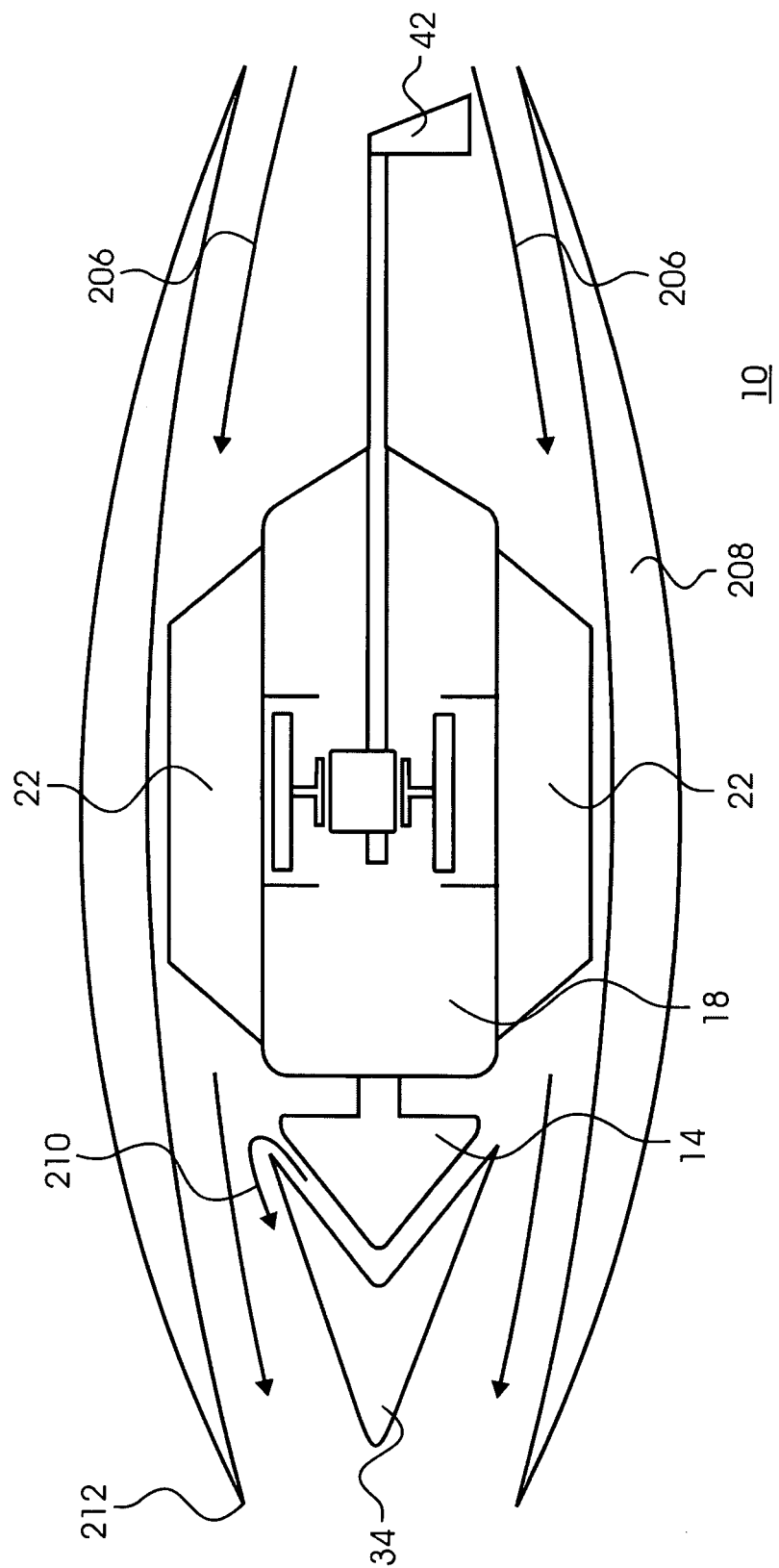
FIG. 16 is a schematic illustrating an energy conversion device designed to perform as a ducted jet engine.

FIG. 16 illustrates an embodiment of the energy conversion device 10 designed to perform in a manner similar to a ducted (fan) jet engine. Such a device may have vanes configured to propel air 206 through an engine duct 208. Reaction air may be heated by waste heat rejected at the heat rejecter and by exhaust gases 210 leaving both the heat absorber 14 and primary energy source 34. The heated air may exit the engine at an increased velocity through a nozzle 212. The embodiment depicted in FIG. 16 is conceptually similar to the embodiment depicted in FIG. 14 except that it further includes the duct 208 to channel air across the rotary unit and an expansion chamber at the exit of the duct. In such an embodiment, radial pistons may be preferred but not required. For high rotational speeds, a scroll type expander or other high speed expander may be preferred, but not required.

Figure 17:
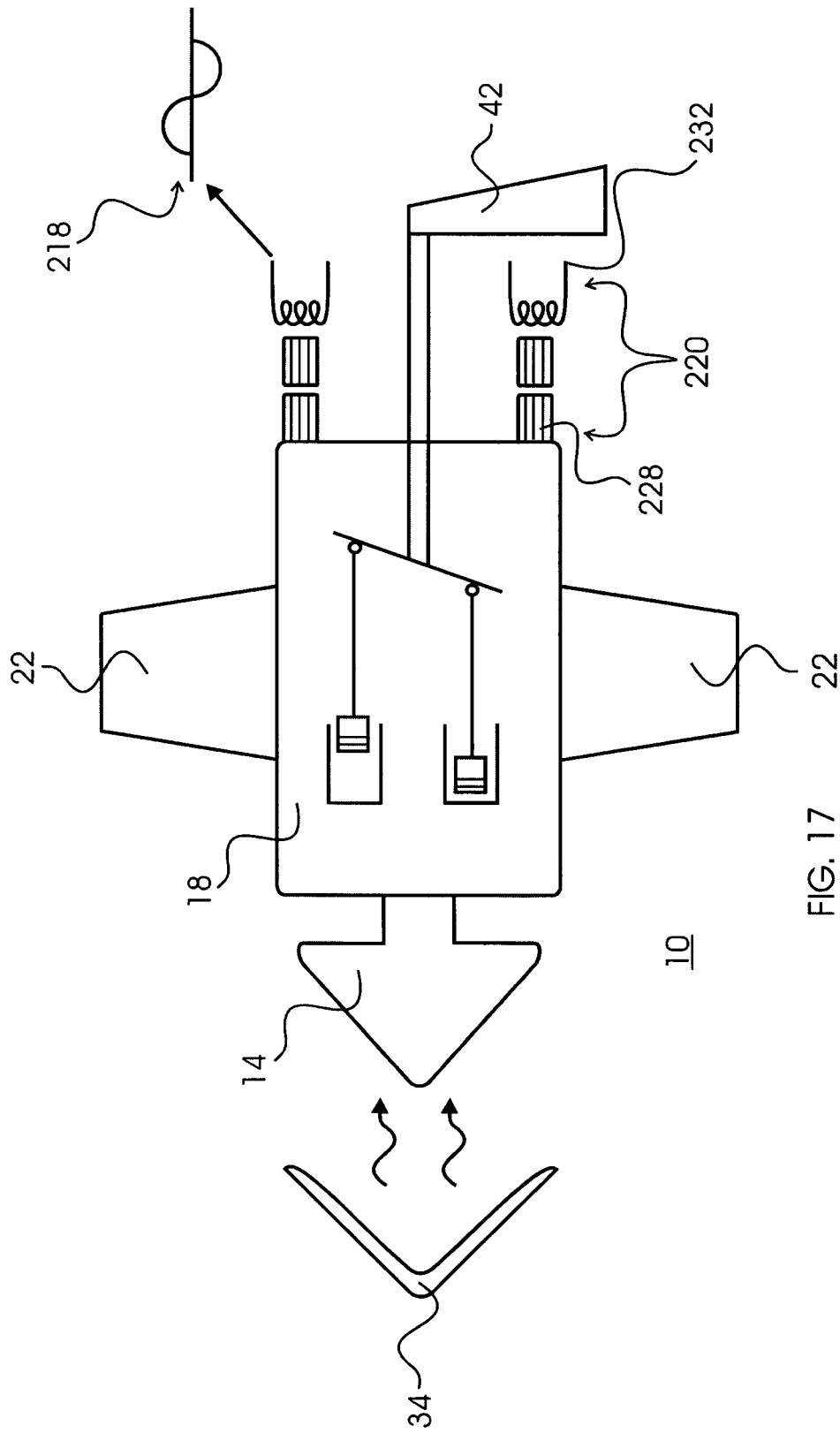
FIG. 17 is a schematic illustrating an energy conversion device designed to produce electrical energy.

FIG. 17 illustrates an embodiment of the energy conversion device designed to produce electrical energy 218. As illustrated, such an energy conversion device 10 may further include a generator component 220 which may induce a current flow in a receiver circuit. A rotor 228, which may include field coils, permanent magnets or other generator components may be fixed to the rotating unit. A stator 232, which may include windings may be fixed to the shaft 42.

Figure 18:
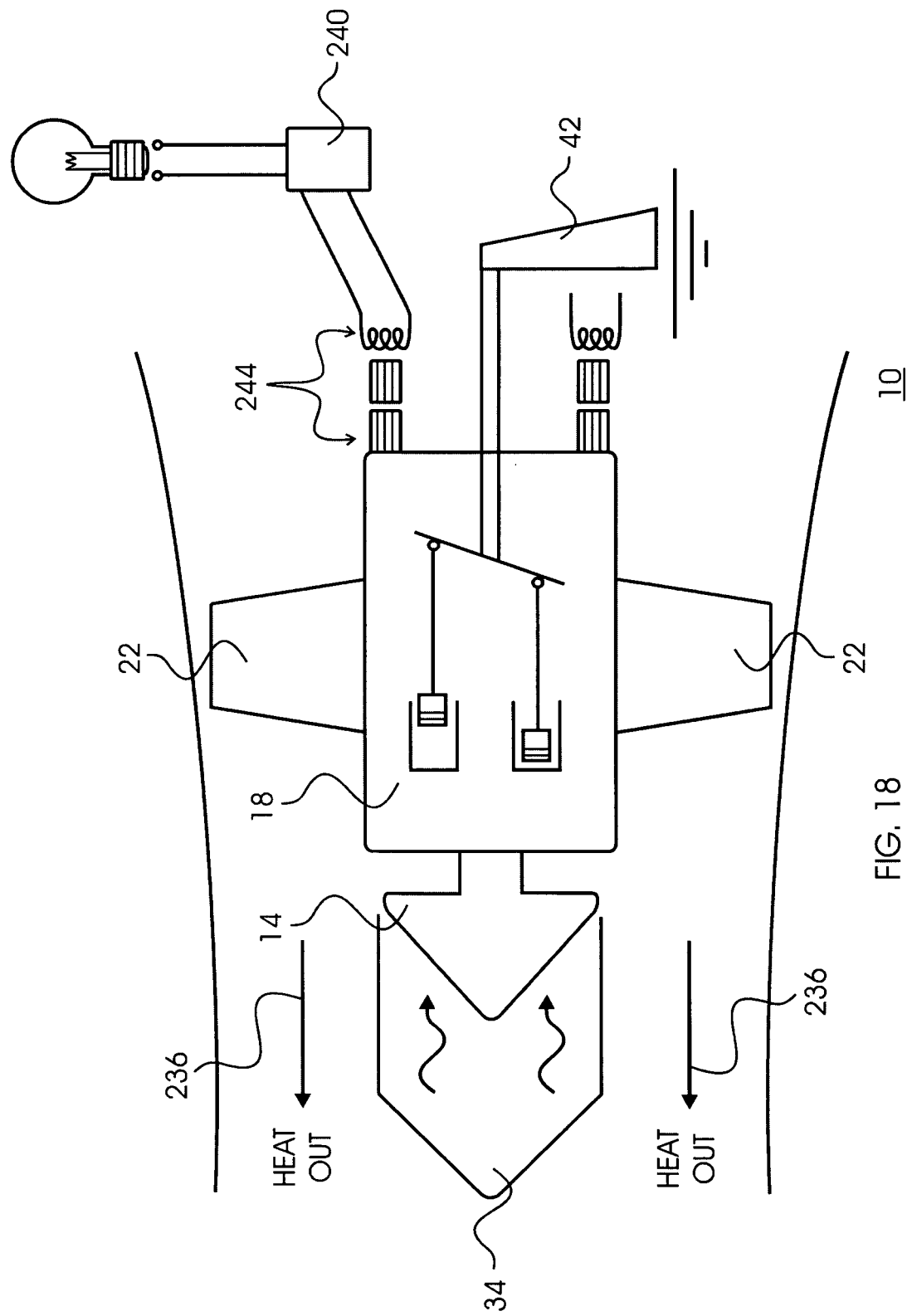
FIG. 18 is a schematic illustrating an energy conversion device designed to deliver heat and electrical energy.

FIG. 18 illustrates an embodiment of the energy conversion device 10 designed to supply both heat 236 and electrical power 240. As illustrated, the power converter 18 and the heat rejecter 22 may rotate, thereby driving a generator 244, and rejecting heat 236 to an air stream or a water stream. The rejected heat 236 may accelerate the air stream or water stream. The heat 236 rejected to the air stream or the water stream may be used to heat an enclosed space, and electrical energy 240 produced in the generator 244 may be conditioned by an electrical power conditioner for use in-house or for delivery to a grid.

Figure 19:
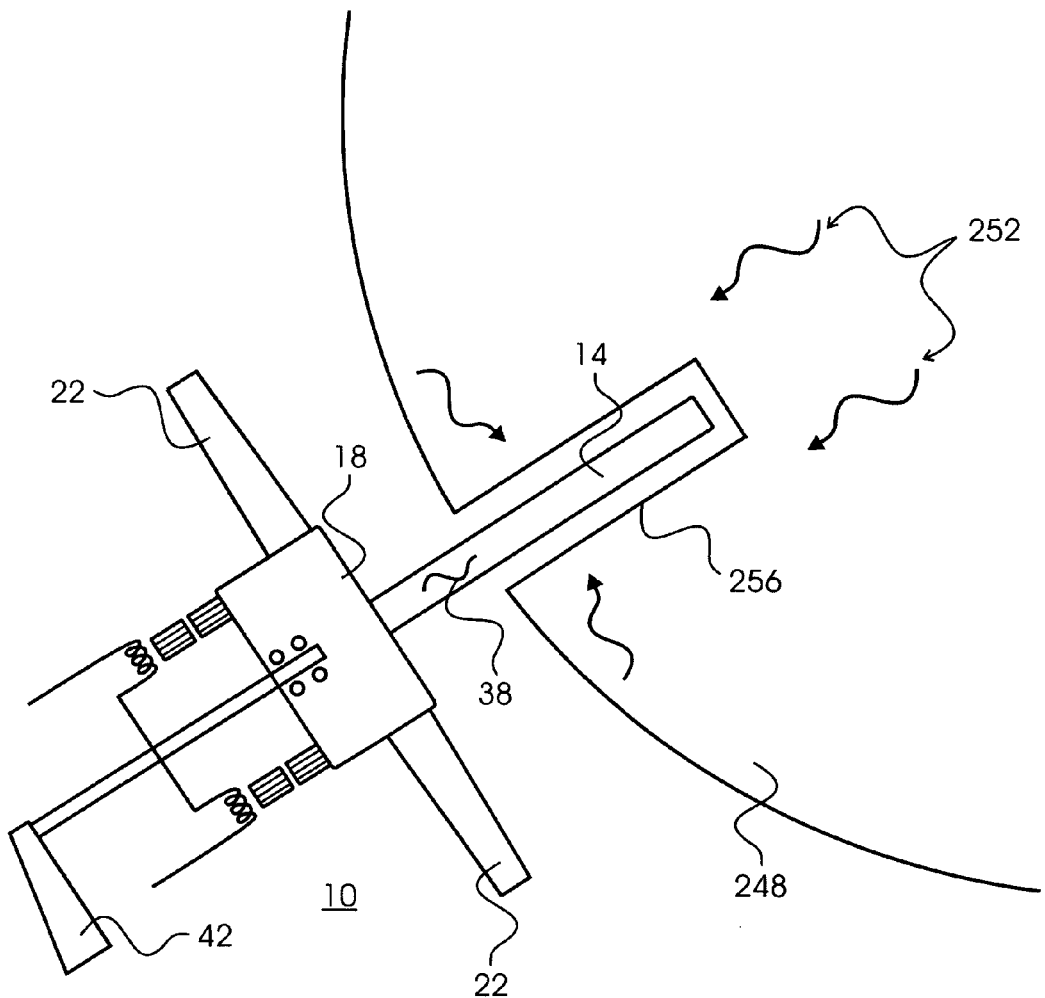
FIG. 19 is a schematic illustrating an energy conversion device integrated into a solar energy conversion device.

FIG. 19 illustrates an embodiment of the energy conversion device 10 integrated into a solar energy conversion device 248. As shown, radiant energy 252 from the sun may be collected by a parabolic reflector 256. The reflector 256 may be focused on the heat absorber 14, thereby heating the working fluid 38 therein. The heat absorber 14 may be a transparent tube enclosing a heat receiver held under vacuum conditions. The embodiment depicted in FIG. 19 may incorporate other configurations capable of absorbing the maximum amount of heat and re-radiating the lowest amount of infrared radiation, such as a trough type parabolic reflector with a circulating heat exchange fluid that may be accelerated by the heat absorber impeller assembly. The solar energy conversion device 248 may also have a transparent heat absorption window, and a rotating heat rejection assembly that may be shaded by the solar collector. Rejected heat may be used to heat a house or building in a combined heat and power unit.

Figure 20:
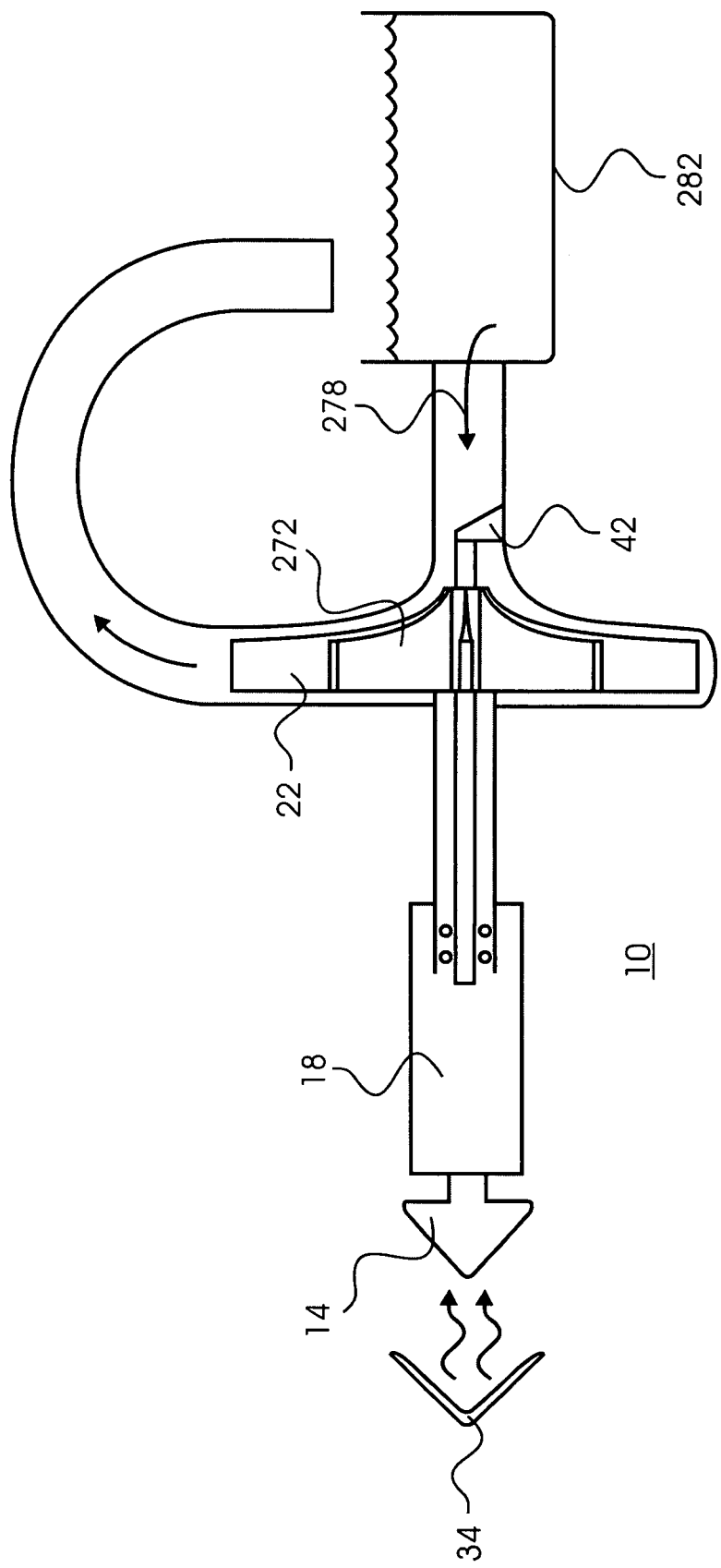
FIG. 20 is a schematic illustrating an energy conversion device configured to be a pump and heater.

FIG. 20 illustrates an embodiment of the energy conversion device 10 as a combined heat and pumping device. As illustrated such a device 10 may deliver rotational energy to a pump impeller 272 which may accelerate a fluid 278 to and from a tank 282. The waste heat of the device may be delivered to the fluid 278 in the tank 282, giving the device 10 a very high fuel to energy conversion efficiency. The device 10 may perform both functions of pump and heater, obviating the need for an electric motor driven pump and furnace. Such a device 10 may be used for heating buildings, for process heat, or in an ethanol plant or for a fermenting operation, for example.

Figure 21:
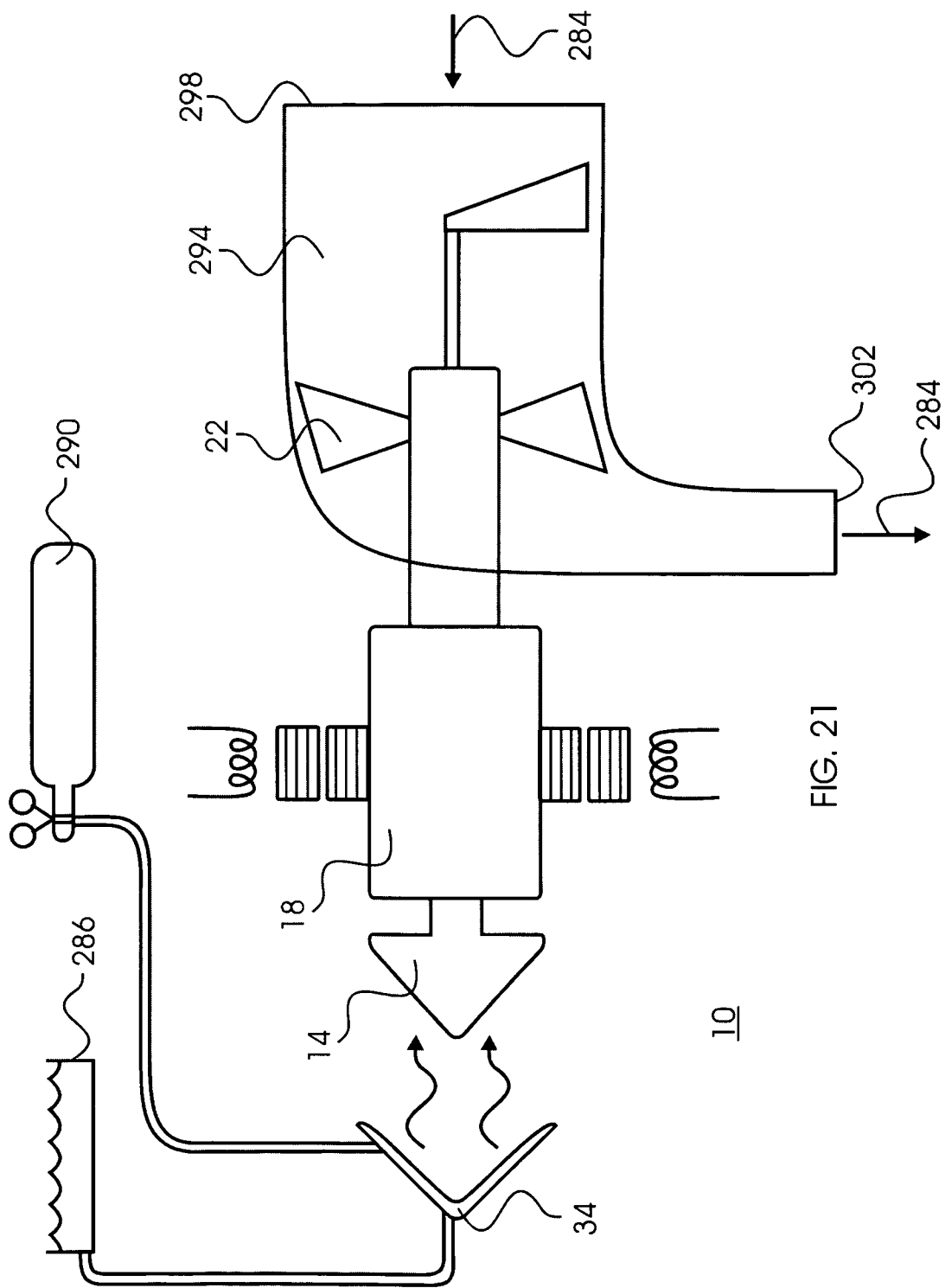
FIG. 21 is a schematic illustrating an energy conversion device configured to power an underwater vehicle.

FIG. 21 illustrates an embodiment of the energy conversion device 10 designed to power an underwater vehicle. Water 284 may be accelerated and expanded producing thrust for propulsion and station keeping. Fuel 286 and a high pressure oxidant 290 may be delivered to the primary energy source 34 from storage tanks. The primary energy source 34 may operate at a pressure higher than the exterior water pressure thereby allowing the exhaust to exit the system. As shown, the water 284 may enter a nozzle 294 at a first end 298 and may exit at a second end 302 thereby propelling the vehicle.

Figure 22:
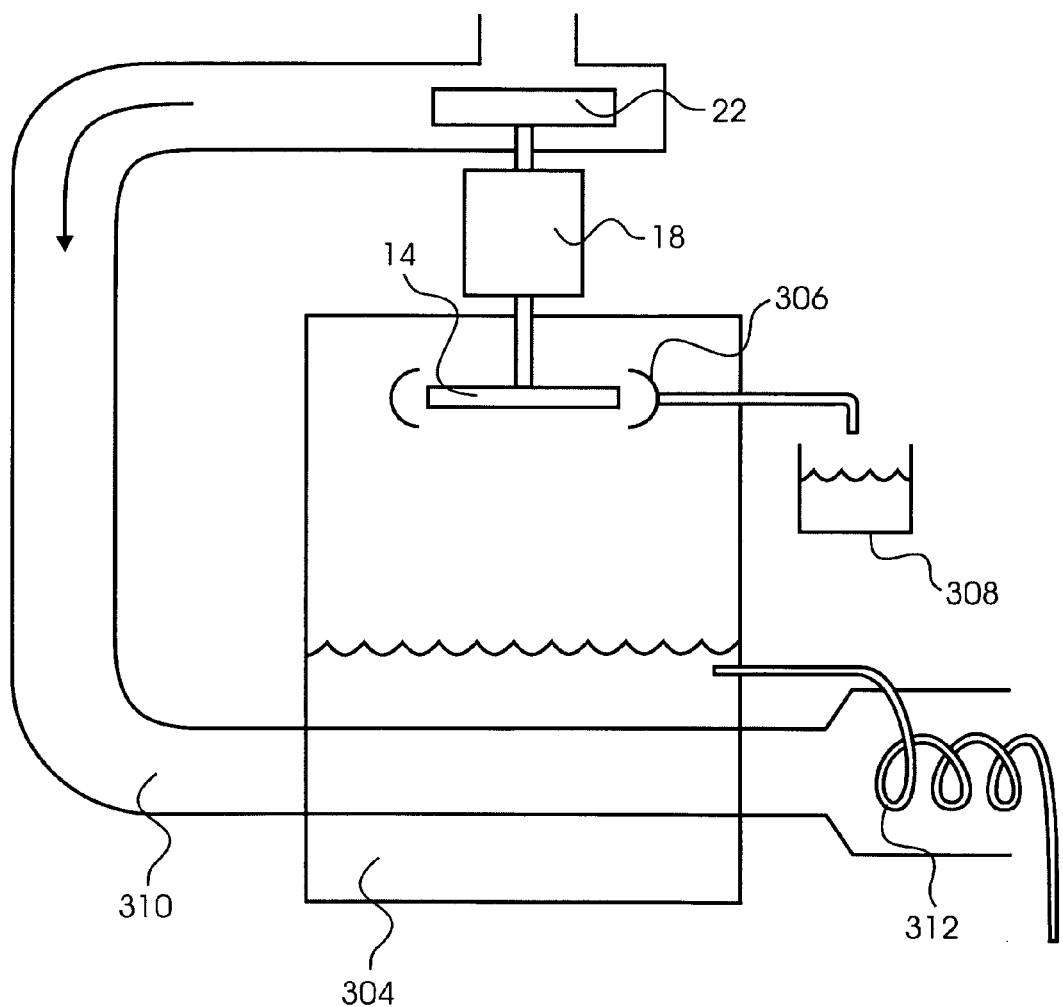
FIG. 22 is a schematic illustrating an energy conversion device configured as a distillation heat pump.

FIG. 22 illustrates an embodiment of the energy conversion device 10 configured as a distillation heat pump. The rotating heat absorber 14 or cool side of the heat pump, can condense the vapor eluting from a complex fluid 304 and centrifugally eject the condensate toward a receiver 306 and then to a holding tank 308. The complex fluid 304 may be water and ethanol for example. The heat of condensation is rejected at the heat rejecter 22 and carried via liquid or gas in a conduit/heat exchanger 310 to the complex liquid 304. Any remaining heat may be used to preheat incoming liquid in a coil 312.

Figure 23:
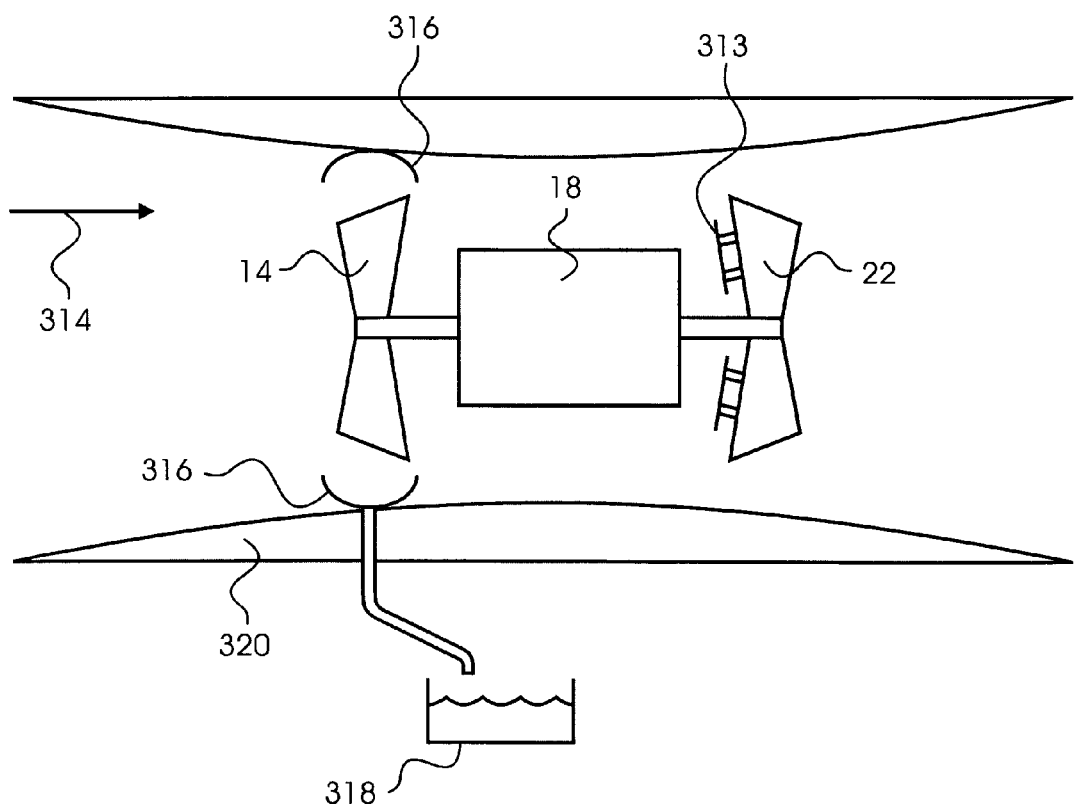
FIG. 23 is a schematic illustrating an energy conversion device configured to be a dryer, a dehumidifier, and/or for producing clean water from air.

FIG. 23 illustrates a "water from air" embodiment of the energy conversion device 10 that can be used for drying purposes (clothes, agricultural products, lumber), dehumidifying, and for producing clean water from air. The device 10 may be wind or electrically powered. Thermoelectric devices 313 may be attached to the heat ejector 22 to recapture some of the heats of condensation, convert that heat to electricity, and pump that energy via electric motor action back into the power converter (or heat pump compressor in this case) 18. The device 10 operates by condensing vapor from a gas stream 314 onto the heat absorber (or cold side) 14 where droplet formation occurs and liquid condensate is centrifugally ejected and collected at a collector 316 where it flows to a tank 318. The now cooled gas flows toward the heat rejecter 22. The heat absorber 14 may contain surface features such as hydroscopic and hydrophilic areas that promote drop formation and assist the drop ejection. If the device 10 is wind driven, for instance in a remote area, the heat transfer surfaces act as wind turbine blades, delivering rotational energy to the power converter or heat pump compressor 18. The device may be contained in a venturi 320 which acts to increase the air speed, and therefore the power developed by the combined turbine blades/heat transfer structures. Conversely, the device may be powered by an electric motor or other power source.

Figure 24:
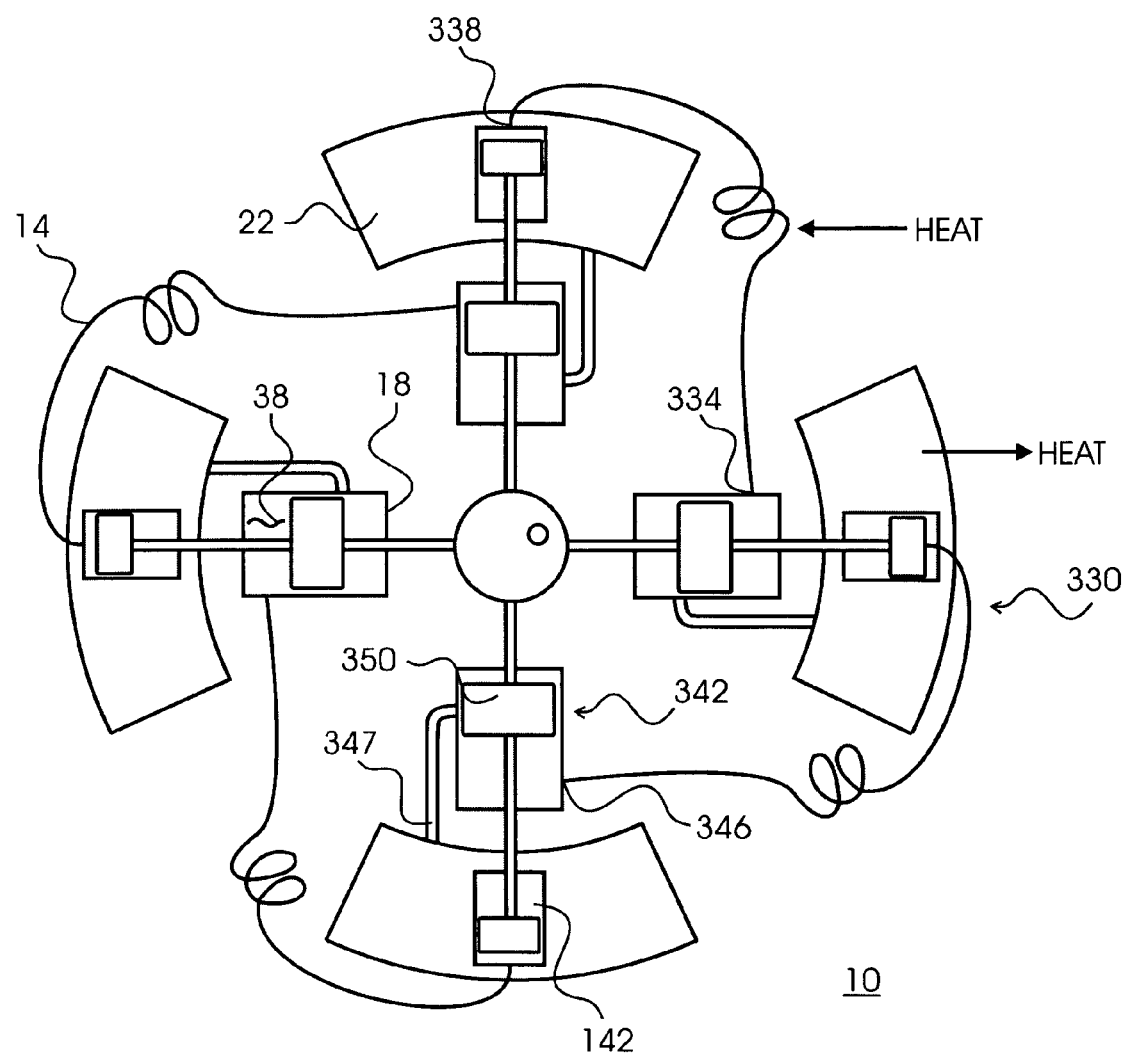
FIG. 24 is a schematic illustrating a valve-less energy conversion device.

FIG. 24 illustrates a valveless embodiment of the energy conversion device 10. In such a design the device may include a plurality of power units 330. Each power unit 330 may have a working fluid inlet 334 connected to a working fluid outlet 338 of an adjacent power unit 330. Each power unit 330 may further include its own respective heat absorber 14, power converter 18, and heat rejecter 22. Each heat absorber 14 may receive the working fluid 38. As shown, each power converter 18 may consist of a power piston assembly 342 having a first end 346 for receiving the working fluid 38 from the heat absorber 14, thereby driving a piston 350 in a first direction. Each heat rejecter 22 may receive the working fluid 38 from a respective piston assembly 342 through uni-flow exhaust port 347. Each heat rejecter 22 may be shaped as a fin or propeller for cooling the working fluid 38 and a pump 142 for receiving the working fluid condensate and for pumping the working fluid condensate to the heat absorber 14 of an adjacent power unit 330. All of the power units 330 may be connected together to rotate as a single rotary unit. The power units 330 are connected out of phase so that pump 142 is delivering fluid 38 to the heat absorber 14, driving the expansion stroke of an adjacent power piston assembly 142.

Figure 25:
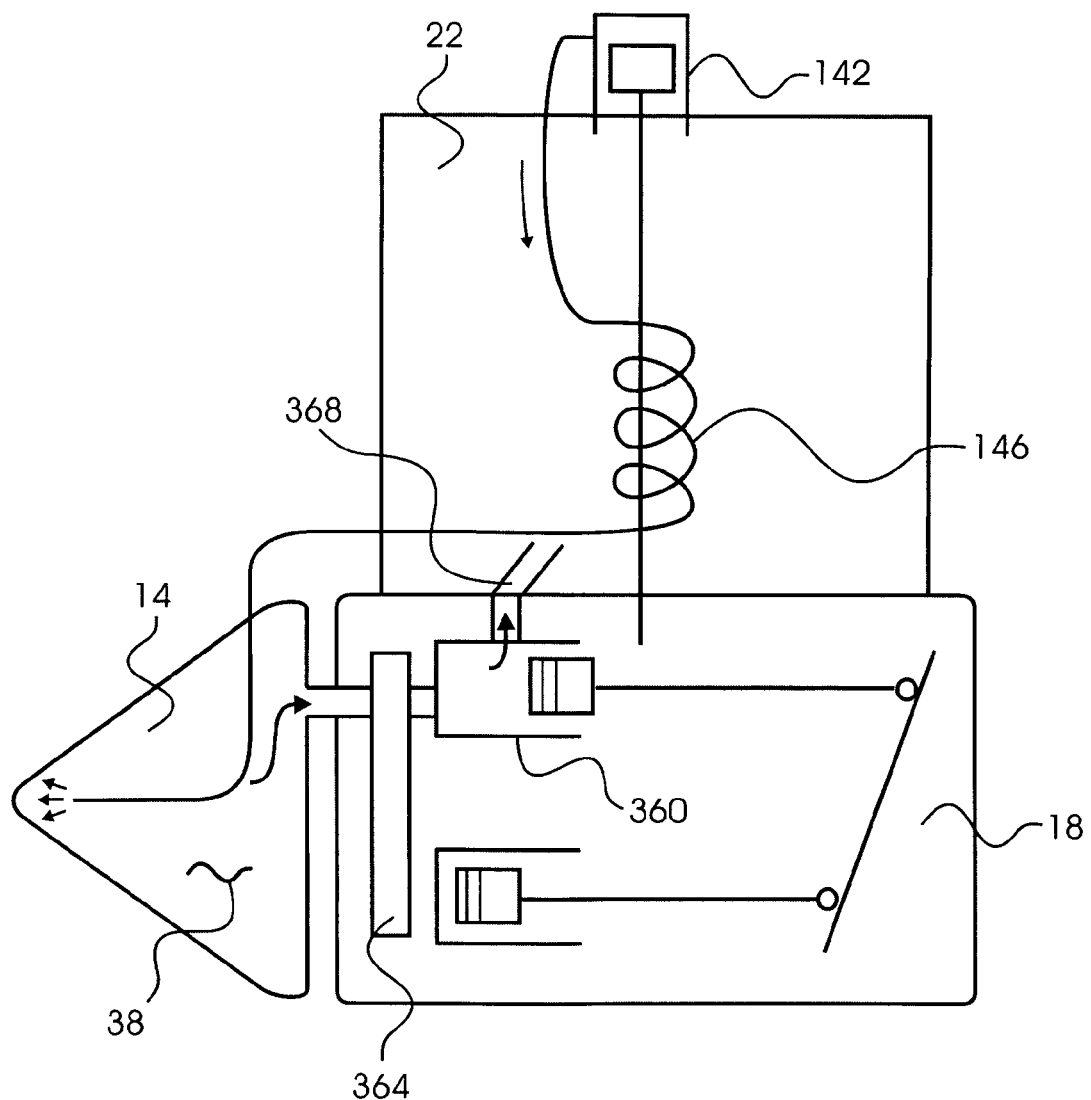
FIG. 25 is a schematic illustrating fluid flow through an energy conversion device.

FIG. 25 depicts the working fluid flow of the energy conversion device 10. The working fluid 38 may be vaporized in the heat absorber 14. The high pressure vapor may then enter the power converter 18. In the embodiment depicted, the high pressure vapor may enter a piston/cylinder 360 via a valve plate 364. The piston 360 may be driven to the end of a stroke and the expanded vapor may then enter the heat rejecter 22 via an exhaust port 368. Some of the waste heat may be deposited at the heat exchanger 146 and the vapor may condense inside. The condensate may centrifugally be forced to the pump 142 and the pump 142 may then pump the fluid 38 through the heat exchanger 146 where it may be preheated before going back to the heat absorber 14, to complete the cycle.

Figure 26:
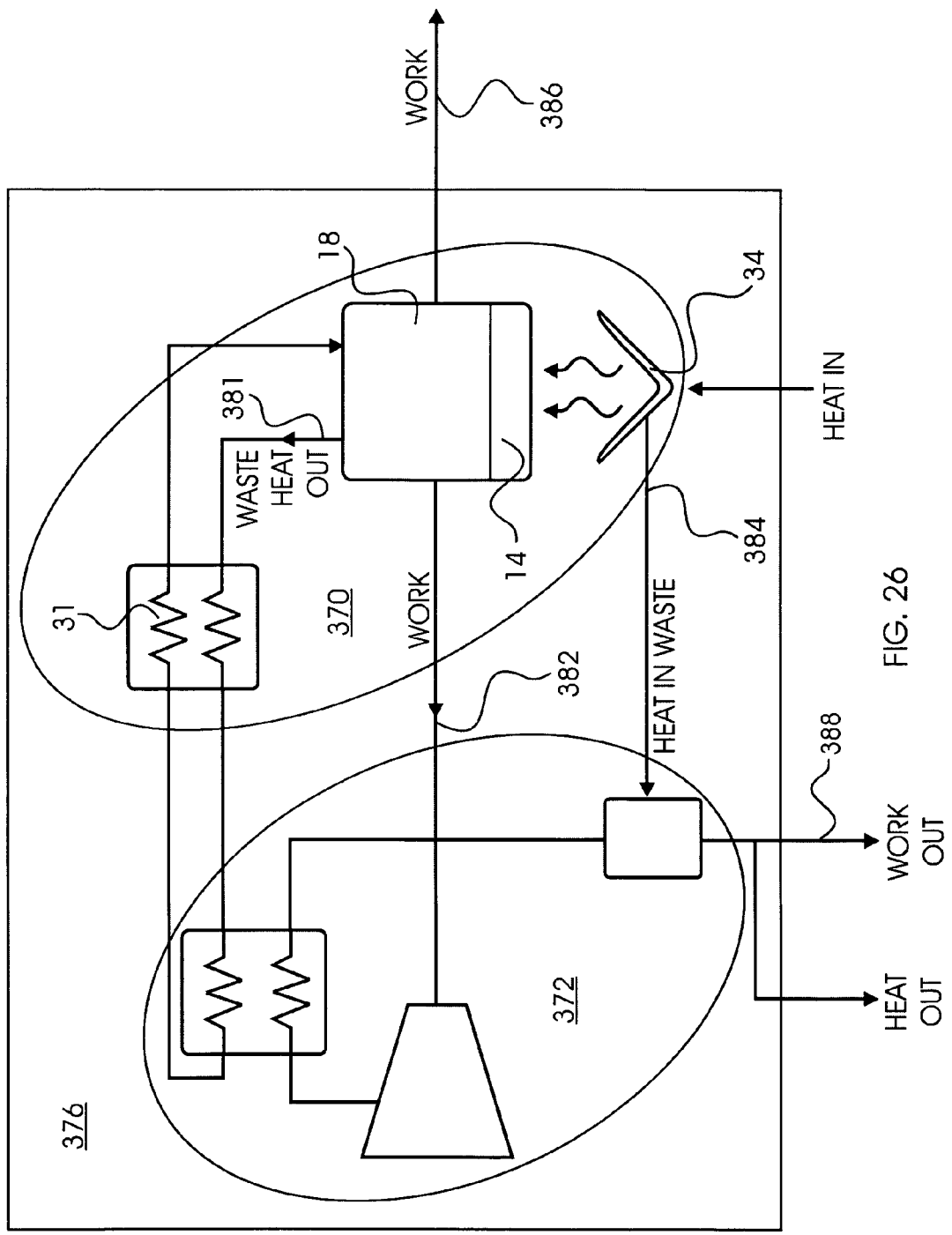
FIG. 26 is a schematic illustrating thermal and work pathways for an energy conversion device.

FIG. 26 illustrates the thermal and work pathways for embodiments of the device 10. As illustrated, the thermodynamic and work pathways, represent a unique combination of thermodynamic cycles different from conventional cycles, such as Otto, Diesel, Rankine, and Brayton, for example. In this particular embodiment the device 10 may have components to produce a first thermodynamic cycle 370, and components to produce a second thermodynamic cycle 372. The components producing the first thermodynamic cycle 370 may be similar to the regenerative Brayton cycle, except that the heat exchanger and the compressor functions are performed by the rotating heat rejecter 22 which may compress and add heat simultaneously. Heat may also be added by the addition of the combustor exhaust. The cycle efficiency for a regenerative Brayton cycle engine is given by the formula:

$$\eta_c = 1 - \left(\frac{T_L}{T_H}\right)\left(\frac{P_H}{P_L}\right)^{(K-1)/K}$$

where the subscript L and H indicate absolute minimum/maximum temperatures and pressures, and K is a gas quality factor. It can be seen that for very low pressure ratios, Carnot cycle efficiencies can be approached.

FIG. 26 illustrates the synergistic nature of the relationships between the pathways of the first and second thermodynamic cycles 370 and 372 to the total thermodynamic and work pathways 376 of the device. The components of the first thermodynamic cycle 370 may be typical components of a Brayton, Rankine, Stirling, or other closed cycle engine. As shown, the primary energy source 34 may heat the heat absorber 14 that is in fluid communication with the power converter 18. The power converter 18 may deliver waste heat 381 and work output 382 to the heat rejecter 22. The heat rejecter 22 may also form the compressor and heat recuperator of a recuperative Brayton cycle engine. Waste heat output 384 of the energy source 34 may be analogous to the combustor of the Brayton cycle engine. Therefore, the device 10 may be a single device that employs multiple thermodynamic cycles, and the engine components may perform multiple overlapping functions. The resulting new complex thermodynamic cycle 376 may be the additive and parallel operation of two distinct conventional thermodynamic cycles 370 and 372. The resulting efficiency is higher than that of either cycle, but is not strictly additive because additional work is performed on the Brayton cycle compressor. The energy output of the engine is expressed as mechanical work 386 and as thrust or acceleration of a fluid via mechanical and expansion work 388.

The engine may be tailored to various ratios of work at the mechanical output and the accelerating (thrust) output. Also, the ratio of heat output to mechanical output may be varied.

Figure 27:
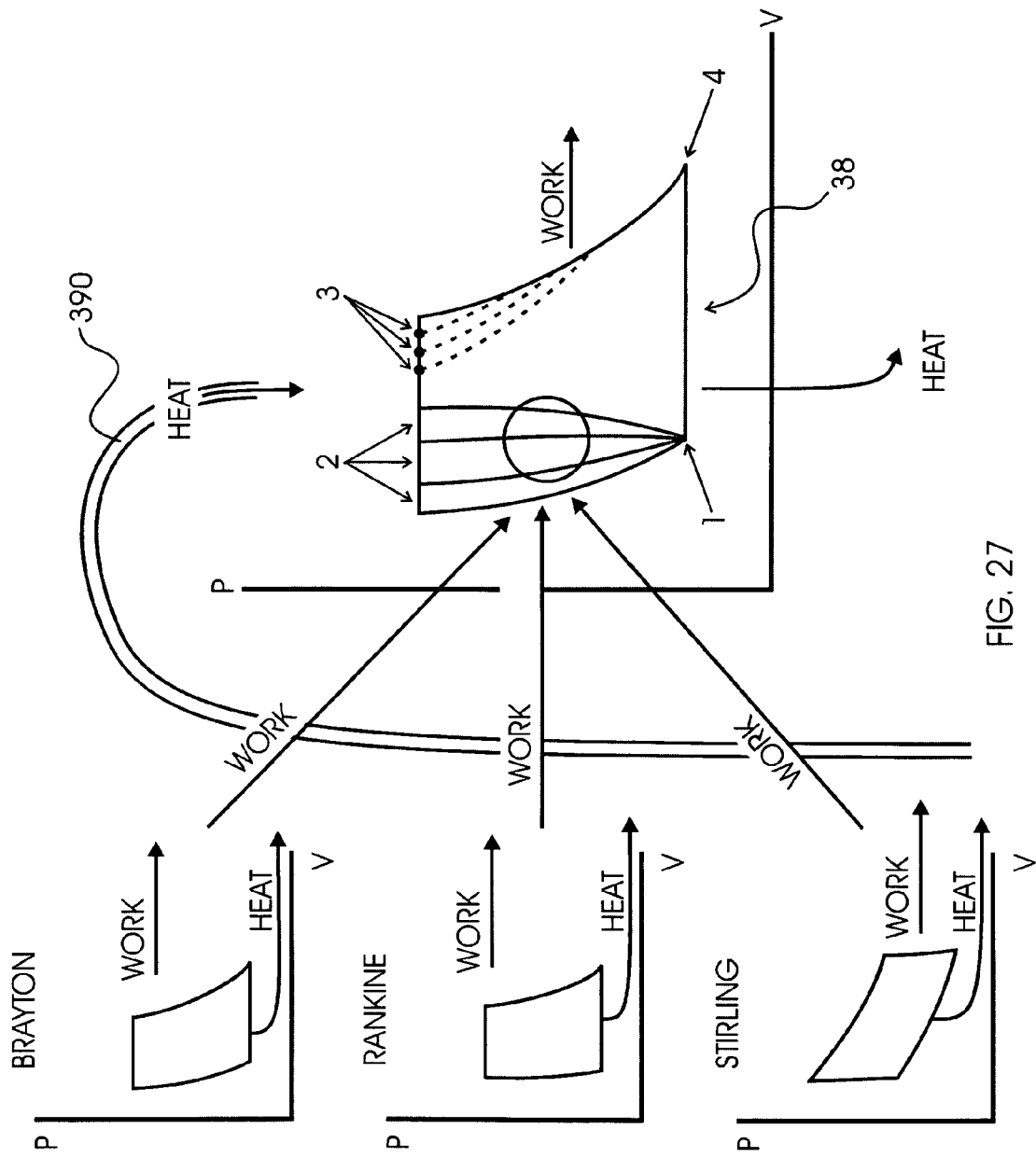
FIG. 27 is a diagram illustrating the multiple thermodynamic cycles being utilized to create work.

FIG. 27 illustrates the cooling fluid as it goes through the several states. From state 1 to state 2, work is added by the Brayton, Stirling, or Rankine engine, which compresses the cooling fluid 134 to pressure $P_2$ and volume $v_2$. Heat 390 (rejected from the Brayton, Rankine or Stirling engine) may be added at this stage, thereby expanding the cooling fluid 134. Multiple P-v curves are shown to illustrate several possible pressure and thermal processes that the cooling fluid 134 may undergo depending on the degree of compression and the amount of heat added. From state 2 to state 3, waste heat from the combustion exhaust may be added, and the fluid may be expanded under constant pressure. From state 3 to state 4 the cooling fluid 134 may be expanded to generate thrust.

Figure 28:
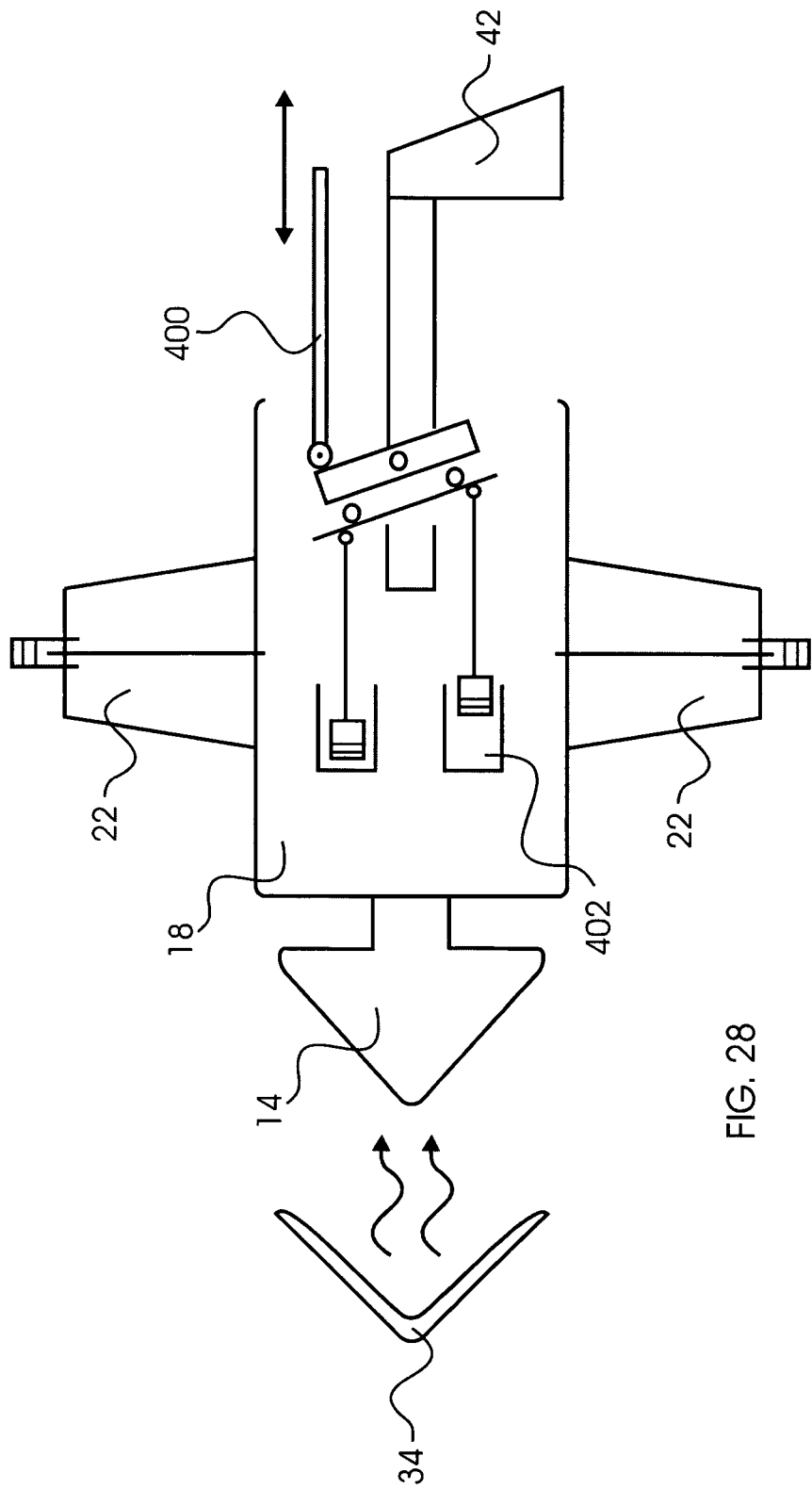
FIG. 28 is a schematic illustrating an energy conversion device utilizing a variable swash plate.

FIG. 28 illustrates how a variable angle swash plate 400 may change the stroke of piston assemblies 402, thereby changing the torque developed by the system. Therefore the device 10 may be constructed to have variable torque characteristics or may operate at high speeds with reduced heat input. The embodiment depicted is an example of an axial piston configuration. The swash plate 400 may be fixed or angle changeable.

Figure 29:
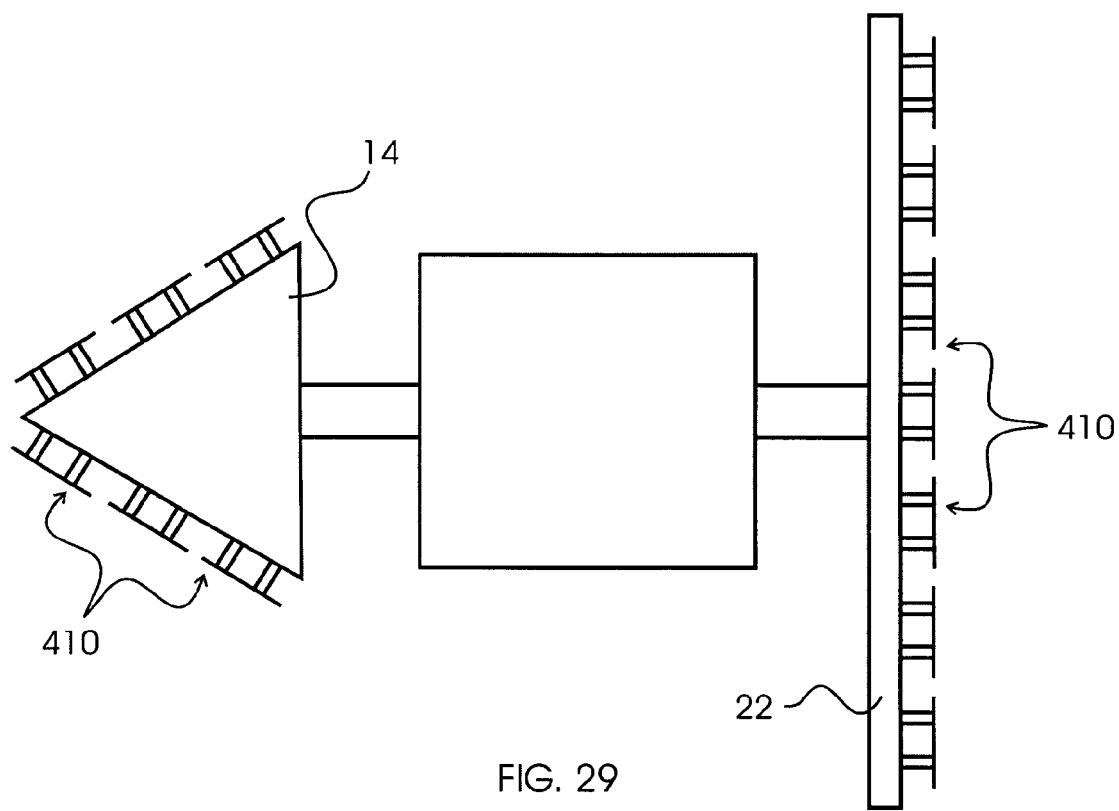
FIG. 29 is a schematic illustrating topping and bottoming cycle energy converters.

As illustrated in FIG. 29, the energy conversion device 10 may have topping and bottoming cycle energy converters 410 attached directly to the surfaces of the heat absorber 14 and heat rejecter 22. These energy converters may be thermoelectric, thermionic, thermophotovoltaic or magnetohydrodynamic converters.

Figure 30:
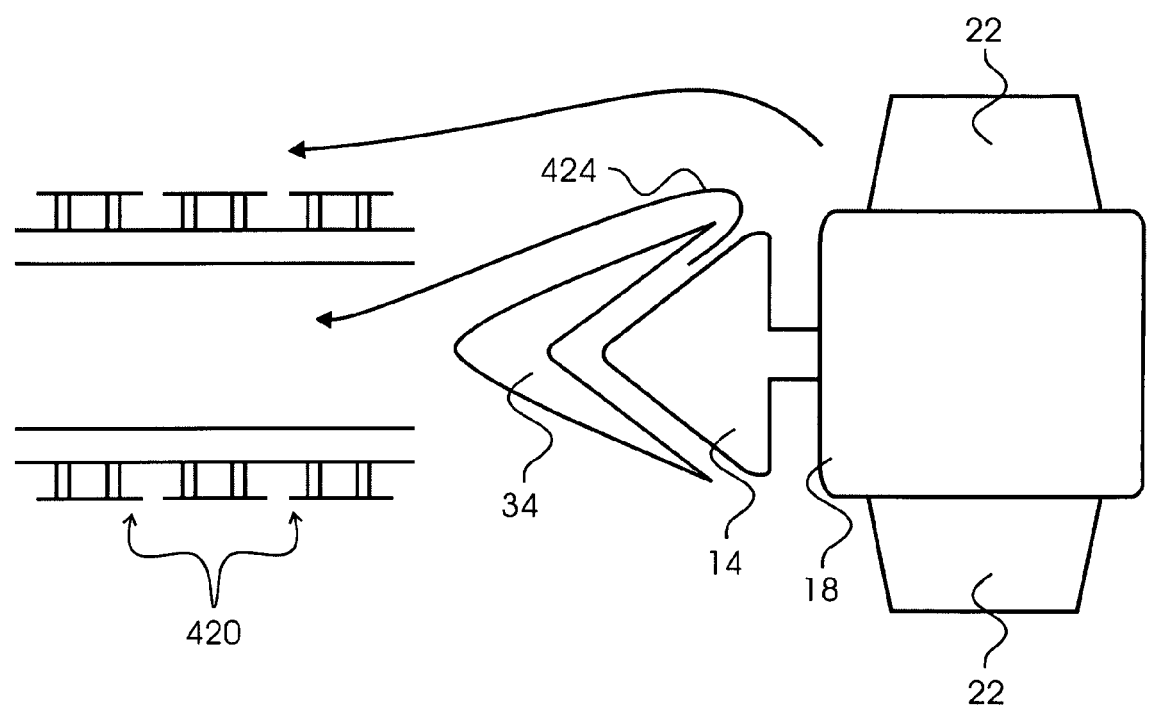
FIG. 30 is a schematic illustrating an energy conversion device utilizing thermoelectric or thermionic or thermophotovotaic or magnetohydrodynamic converters.

As illustrated in FIG. 30 the energy conversion device 10 may use thermoelectric, thermophotovoltaic, or thermionic or magnetohydrodynamic converters 420 to capture exhaust energy 424 that exits the energy source 34. The rotating condenser shown in FIG. 23 could provide cooling air or fluid to the cold side of the converter 420.

Figure 31:
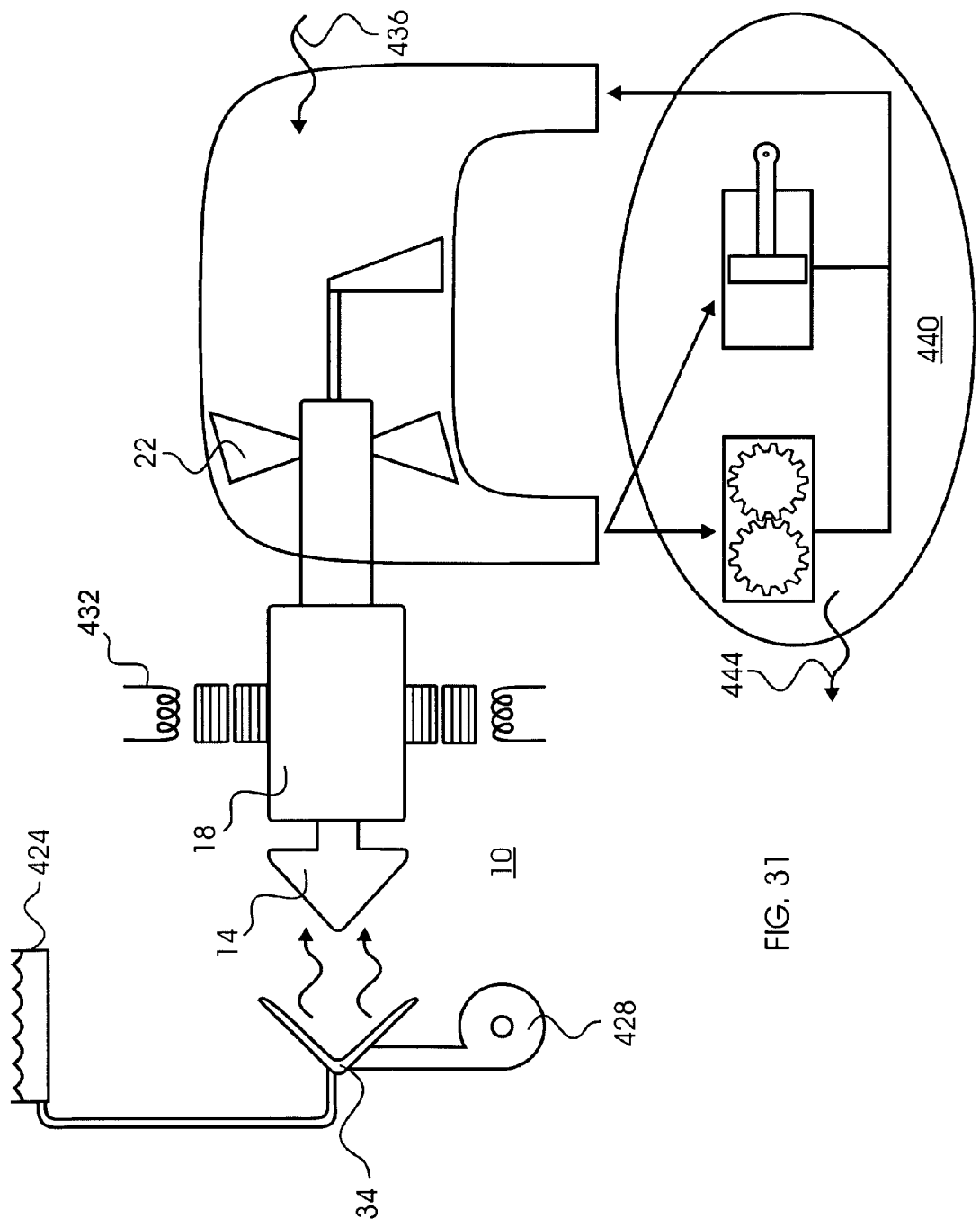
FIG. 31 is a schematic illustrating an energy conversion device configured to provide electric and hydraulic power for a robotic or energy independent device.

FIG. 31 illustrates an embodiment of the energy conversion device 10 designed to power a robotic or other energy independent device. Fuel 424 and oxidant 428 may be delivered to combustor 34, or solar energy or energy produced from radioactive decay may deliver energy to heat absorber 14. Power converter 18 drives a generator 432. Heat rejecter 22 may be configured to accelerate and pressurize a fluid 436, such as a hydraulic fluid, which may be delivered to hydraulic power conversion components 440. The hydraulic power conversion components 440 may act in combination to form a heat rejection surface 444. Such a device may be used for energy independent devices requiring a source of electricity for command and control, and hydraulic power for gross motor functions. Such a device may have an order of magnitude greater energy density compared to batteries and may be operated indoors, producing only carbon dioxide as a waste product.

What is claimed:

1. A rotary energy conversion device comprising:
   a heat absorber having a working fluid therein;
   an energy source to provide energy to the heat absorber, wherein at least 51% of the energy provided is radiant energy;
   a power converter in fluid communication with the heat absorber;
   a heat rejecter in fluid communication with each one of the heat absorber and power converter;
   wherein the heat rejecter has a pump capable of receiving the working fluid from the power converter and pumping the working fluid to the heat absorber; and
   a recuperating heat exchanger having a first channel for the working fluid from the power converter and a second channel for the working fluid from the pump;
   whereby (i) the heat absorber, the power converter, and the heat rejecter are connected together to rotate as a single rotary unit relative to a shaft and (ii) rotation of the single rotary unit increases contact between the working fluid and internal surfaces of the heat absorber and the heat rejecter thereby increasing heat flux.

2. The device of claim 1 wherein at least 70% of the energy provided is radiant energy.

3. The device of claim 1 wherein the energy source includes a segmented radiant primary energy source, the energy source having a plurality of segments, wherein each segment is capable of being on or off.

4. The device of claim 1 wherein the energy source includes at least one of a micro-porous combustor, a catalytic combustor, and a micro channel combustor.

5. The device of claim 1 wherein the shaft is stationary.

6. The device of claim 1 wherein the heat rejecter has an external surface for contacting and accelerating a cooling fluid and an internal surface for contacting the working fluid.

7. The device of claim 1, wherein the recuperating heat exchanger has a surface area to volume ratio of at least 10:1.

8. The device of claim 6 wherein the internal surface of the heat rejecter includes at least one of channels, micro-channels, vanes, and an expansion chamber.

9. The device of claim 6 wherein the heat rejecter is adapted to impart thrust relative to the energy conversion device.

10. The device of claim 9 wherein the cooling fluid is water and the heat rejecter propels water relative to the energy conversion device.

11. The device of claim 10 further comprising a housing for directing the cooling fluid over the heat rejecter.

12. The device of claim 10, wherein the cooling fluid is expanded by wasted heat from the device thereby creating additional thrust relative to the device.

13. The device of claim 9 wherein the cooling fluid is ambient air and the heat rejecter propels air relative to the energy conversion device.

14. The device of claim 13 further comprising a duct in which the heat rejecter is located, the duct channels the air across the rotary unit, the duct having a nozzle at a discharge end thereof.

15. The device of claim 13, wherein the cooling fluid is expanded by wasted heat from the device thereby creating additional thrust relative to the device.

16. The device of claim 1 wherein the power converter includes at least one piston that is driven by the working fluid.

17. The device of claim 16 further comprising a swash plate.

18. The device of claim 17, wherein the swash plate is angle changeable.

19. The device of claim 1 wherein the power converter includes a turbine that is driven by the working fluid.

20. The device of claim 1, wherein the power converter comprises:
   a piston cylinder having a power piston therein and an opening substantially at its center; and
   at least two inlet valves disposed substantially at each end of the piston cylinder, whereby vapor is admitted to the piston cylinder at each inlet valve and exits at the substantially central opening.

21. The device of claim 1, wherein the power converter comprises:
   a first piston assembly having a power piston, a chamber, and a rod;
   a second piston assembly having a power piston, a chamber, and a rod; and
   a mechanical connection connected to each one of the first piston assembly rod and the second piston assembly rod; the first piston assembly being out of phase with the second piston assembly;
   wherein the working fluid flows from a cold side of the first piston assembly into a hot side of the second piston assembly.

22. The device of claim 1 further comprising a drive for transmitting rotation of the rotating unit to an output shaft.

23. The device of claim 1 further comprising a nozzle.

24. The device of claim 1, further comprising a generator assembly coupled to the rotary unit, whereby a current flow is induced in the generator assembly.

25. The device of claim 6 wherein the heat rejecter delivers heat to a remote area via the accelerated fluid.

26. A rotary energy conversion device comprising:
   a heat absorber having a working fluid therein;
   a segmented radiant primary energy source having a plurality of segments, wherein each segment can be either activated or deactivated to deliver radiant energy to the heat absorber;
   a power converter in fluid communication with the heat absorber;
   a heat rejecter in fluid communication with each one of the heat absorber and power converter;
   wherein the heat rejecter has a pump in fluid communication with the heat rejecter, the pump being capable of receiving the working fluid from the power converter and pumping the working fluid to the heat absorber; and
   a recuperating heat exchanger having a first channel for the working fluid from the power converter and a second channel for the working fluid from the pump;
   whereby the heat absorber, the power converter, and the heat rejecter are connected together to rotate as a single rotary unit relative to a shaft.

27. The device of claim 26 wherein the segmented radiant primary energy source includes at least one of a micro-porous combustor, a catalytic combustor, and micro channel combustor.

28. The device of claim 26 wherein the shaft is stationary.

29. The device of claim 26 wherein the heat rejecter has an external surface for contacting a cooling fluid and an internal surface for contacting the working fluid.

30. The device of claim 26, wherein the recuperating heat exchanger has a surface area to volume ratio of at least 10:1.

31. The device of claim 29 wherein the internal surface of the heat rejecter includes at least one of channels, microchannels, vanes, and an expansion chamber.

32. The device of claim 29 wherein the heat rejecter is adapted to impart thrust relative to the energy conversion device.

33. The device of claim 32 wherein the cooling fluid is water and the heat rejecter propels water relative to the energy conversion device.

34. The device of claim 33 further comprising a housing for directing the cooling fluid over the heat rejecter.

35. The device of claim 34, wherein the cooling fluid is expanded by the waste heat from the device thereby creating additional thrust relative to the device.

36. The device of claim 32 wherein the cooling fluid is ambient air and the heat rejecter propels air relative to the energy conversion device.

37. The device of claim 36 further comprising a duct in which the heat rejecter is located, the duct channels the air across the rotary unit, the duct having a nozzle at a discharge end thereof.

38. The device of claim 37, wherein the cooling fluid is expanded by the waste heat from the device thereby creating additional thrust relative to the device.

39. The device of claim 26 wherein the power converter includes at least one piston that is driven by the working fluid.

40. The device of claim 39 further comprising a swash plate.

41. The device of claim 40, wherein the swash plate is angle changeable.

42. The device of claim 26 wherein the power converter includes a turbine that is driven by the working fluid.

43. The device of claim 26, wherein the power converter comprises:
a piston cylinder having a power piston therein and an opening substantially at its center; and
at least two inlet valves disposed substantially at each end of the piston cylinder, whereby vapor is admitted to the piston cylinder at each inlet valve and exits at the substantially central opening.

44. The device of claim 26, wherein the power converter comprises:
a first piston assembly having a power piston, a chamber, and a rod;
a second piston assembly having a power piston, a chamber, and a rod; and
a mechanical connection connected to each one of the first piston assembly rod and the second piston assembly rod;
the first piston assembly being out of phase with the second piston assembly;
wherein the working fluid flows from a cold side of the first piston assembly into a hot side of the second piston assembly.

45. The device of claim 26 further comprising a drive for transmitting rotation of the rotating unit to an output shaft.

46. The device of claim 26 further comprising a nozzle.

47. The device of claim 26, further comprising a generator assembly coupled to the rotary unit, whereby a current flow is induced in the generator assembly.

48. The device of claim 29, wherein the heat rejecter delivers heat to a remote area via the accelerated fluid.

49. A rotary energy conversion device comprising:
a heat absorber having a working fluid therein;
a power converter in fluid communication with the heat absorber;
at least one heat rejecter in fluid communication with each one of the heat absorber and power converter;
wherein the heat rejecter has a pump in fluid communication with the heat rejecter, the pump being capable of receiving the working fluid from the power converter and pumping the working fluid to the heat absorber; and
a recuperating heat exchanger having a first channel for the working fluid from the power converter and a second channel for the working fluid from the pump;
wherein (i) the heat absorber, the power converter, and the at least one heat rejecter are connected together to rotate as a single rotary unit relative to a shaft, (ii) the heat rejecter includes an external surface for contacting a cooling fluid, and (iii) the heat rejecter is adapted to add heat to the cooling fluid and to do work on the cooling fluid to thereby accelerate the cooling fluid.

50. The device of claim 49 wherein the heat rejecter acts as a condenser in the Brayton thermodynamic cycle.

51. The device of claim 49 wherein the heat rejecter acts as a regenerator in the Brayton thermodynamic cycle.

52. The device of claim 51 further comprising a duct in which the heat rejecter is located, the duct channels the cooling fluid across the rotary unit, the duct having a nozzle at a discharge end thereof.

53. The device of claim 49 wherein the cooling fluid is water.

54. The device of claim 53 further comprising a housing for directing the cooling fluid over the heat rejecter.

55. The device of claim 49 wherein the shaft is stationary.

56. The device of claim 49 wherein the internal surface of the heat rejecter includes at least one of channels, microchannels, vanes, and an expansion chamber.

57. The device of claim 49 wherein the power converter includes at least one piston that is driven by the working fluid.

58. The device of claim 57 further comprising a swash plate.

59. The device of claim 58, wherein the swash plate is angle changeable.

60. The device of claim 49 wherein the power converter includes a turbine that is driven by the working fluid.

61. The device of claim 49, wherein the power converter comprises:
a piston cylinder having a power piston therein and an opening substantially at its center; and
at least two inlet valves disposed substantially at each end of the piston cylinder, whereby vapor is admitted to the piston cylinder at each inlet valve and exits at the substantially central opening.

62. The device of claim 49, wherein the power converter comprises:
a first piston assembly having a power piston, a chamber, and a rod;
a second piston assembly having a power piston, a chamber, and a rod; and
a mechanical connection connected to each one of the first piston assembly rod and the second piston assembly rod;
the first piston assembly being out of phase with the second piston assembly;
wherein the working fluid flows from a cold side of the first piston assembly into a hot side of the second piston assembly.

63. The device of claim 49 further comprising a drive for transmitting rotation of the rotating unit to an output shaft.

64. The device of claim 49 further comprising a nozzle.

65. The device of claim 49 further comprising a housing disposed around the rotary unit.

66. A valve-less rotary energy conversion device comprising plural power units, a working fluid outlet of each power unit being connected to a working fluid inlet of an adjacent power unit, each power unit comprising:
- a heat absorber for receiving a working fluid;
- a power piston assembly having a first end for receiving the working fluid from the heat absorber, the piston driven by the working fluid in a first direction;
- a heat rejecter for receiving the working fluid from the piston; the heat rejecter including: a pump for (i) receiving the working fluid condensate after the working fluid has been cooled in the heat rejecter and for (ii) pumping the working fluid condensate to the heat absorber of an adjacent power unit;
- wherein the heat rejecter has a pump in fluid communication with the heat rejecter, the pump being capable of receiving the working fluid from the power converter and pumping the working fluid to the heat absorber; and
- a recuperating heat exchanger having a first channel for the working fluid from the power converter and a second channel for the working fluid from the pump;
- whereby all the power units are connected together to rotate as a single rotary unit relative to a shaft.

67. A rotary energy conversion device, comprising:
- a heat absorber having a working fluid therein;
- an energy source to provide energy to the heat absorber, wherein at least 51% of the energy provided is radiant energy;
- a power conversion unit in fluid communication with the heat absorber;
- a heat rejecter in fluid communication with each one of the heat absorber and power converter;
- wherein the heat rejecter has a pump in fluid communication with the heat rejecter, the pump being capable of receiving the working fluid from the power converter and pumping the working fluid to the heat absorber; and
- a recuperating heat exchanger having a first channel for the working fluid from the power converter and a second channel for the working fluid from the pump;
- whereby the heat absorber and the heat rejecter rotate relative to the power converter.

* * * * *

UNITED STATES PATENT AND TRADEMARK OFFICE
CERTIFICATE OF CORRECTION

PATENT NO. : 8,621,867 B2  Page 1 of 1
APPLICATION NO. : 12/525192
DATED : January 7, 2014
INVENTOR(S) : Stephen Douglas Galbraith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1166 days.

Signed and Sealed this
Twenty-second Day of September, 2015

Michelle K. Lee
*Director of the United States Patent and Trademark Office*